United States Patent
Tanida et al.

(10) Patent No.: US 9,882,820 B2
(45) Date of Patent: Jan. 30, 2018

(54) COMMUNICATION APPARATUS

(71) Applicant: HITACHI, LTD., Tokyo (JP)

(72) Inventors: Naoki Tanida, Tokyo (JP); Takashi Isobe, Tokyo (JP); Takeki Yazaki, Tokyo (JP); Tetsuya Oohashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 42 days.

(21) Appl. No.: 15/106,183

(22) PCT Filed: Dec. 10, 2014

(86) PCT No.: PCT/JP2014/082690
§ 371 (c)(1),
(2) Date: Jun. 17, 2016

(87) PCT Pub. No.: WO2015/107806
PCT Pub. Date: Jul. 23, 2015

(65) Prior Publication Data
US 2017/0041240 A1 Feb. 9, 2017

(30) Foreign Application Priority Data
Jan. 15, 2014 (JP) .................. 2014-005330

(51) Int. Cl.
*H04L 12/807* (2013.01)
*H04L 12/64* (2006.01)
*H04L 12/911* (2013.01)

(52) U.S. Cl.
CPC .......... *H04L 47/27* (2013.01); *H04L 12/6418* (2013.01); *H04L 47/82* (2013.01)

(58) Field of Classification Search
None
See application file for complete search history.

(56) References Cited

U.S. PATENT DOCUMENTS

2005/0135252 A1* 6/2005 Singh .................. H04L 47/10
370/236
2007/0025250 A1 2/2007 Shimonishi et al.
(Continued)

FOREIGN PATENT DOCUMENTS

JP 2009-224834 A 10/2009
JP 2012-095190 A 5/2012
(Continued)

*Primary Examiner* — Christine Duong
(74) *Attorney, Agent, or Firm* — Volpe and Koenig, P.C.

(57) ABSTRACT

A transmission apparatus includes: a sending unit configured to send data to a receiver apparatus via the network; a receiving unit configured to receive acknowledgement data including an acknowledgement and information on a receive window size from the receiver apparatus via the network; a transmission bandwidth controller configured to control a bandwidth for data to be sent from the sending unit; a transmission bandwidth restriction unit configured to restrict the bandwidth controlled by the transmission bandwidth controller in such a manner that a data size of data for which no acknowledgement is received from the receiver apparatus among data which is sent is equal to or smaller than an upper limit size determined from the receive window size; and a switching controller configured to switch activation and inactivation of the transmission bandwidth restriction unit based on the data size and the receive window size.

14 Claims, 17 Drawing Sheets

(56) References Cited

U.S. PATENT DOCUMENTS

2007/0280111 A1* 12/2007 Lund .................. H04L 47/10
                                                    370/235
2012/0106376 A1   5/2012 Kikkawa et al.
2014/0355442 A1  12/2014 Isobe et al.

FOREIGN PATENT DOCUMENTS

WO    2005/020524 A1   3/2005
WO    2013/125096 A1   8/2013

* cited by examiner

COMMUNICATION APPARATUS

CLAIM OF PRIORITY

The present application claims priority from Japanese patent application No. 2014-5330 filed on Jan. 15, 2014, the content of which is hereby incorporated by reference into this application.

BACKGROUND OF THE INVENTION

This invention relates to communication bandwidth control.

The progress in speed of the Internet access has propelled the growth of cloud computing. Cloud computing exchanges massive data between data centers and users via the Internet. In the case where a data center is located overseas, data is exchanged through a long-distance network. The long-distance network is called a Wide Area Network (WAN).

The Internet typically uses TCP (Transmission Control Protocol) communication. A feature of the TCP communication is that a receiver computer that has received data sends an acknowledgment (ACK) of the data to the sender computer. Furthermore, in the TCP communication, the receiver computer notifies the sender computer of a numerical value called receive window size (RWIN) together with the ACK.

The sender computer sends data so that the data size called inflight, which is the size of data that has been sent but not acknowledged, will not exceed the RWIN. Accordingly, the inflight is limited up to the RWIN during a Round Trip Time (RTT), which is the time since sending data until receiving a response. For this reason, the transmission bandwidth is limited to the RWIN/RTT at maximum.

The background art of this technology include JP 2012-95190 A, which discloses: a control unit that determines whether a channel with respect to the reception side communication device is in a broad band and high delay circumstance, changes a first state where the transmission window size is a first window size which is not larger than the reception window size to a second state where the transmission window size is a second window size which is larger than the reception window size when the channel is determined to be in the broad band and high delay circumstance, and transmits the packet of the transmission amount larger than the reception window size in the second state.

SUMMARY OF THE INVENTION

The transmission bandwidth control by the method according to JP 2012-95190 A has a possibility that the transmission bandwidth exceeds the RWIN when the congestion window size reaches the RWIN in a burst fashion, if determining that the channel is in a broad band and high delay circumstance. When the transmission bandwidth exceeds the RWIN, the throughput increases unless packet loss occurs; however, if packet loss occurs because of buffer overflow in the receiver computer, the throughput decreases.

A representative example of this invention is A transmission apparatus connectable to a network, the transmission apparatus including: a sending unit configured to send data to a receiver apparatus via the network; a receiving unit configured to receive acknowledgement data including an acknowledgement and information on a receive window size from the receiver apparatus via the network; a transmission bandwidth controller configured to control a bandwidth for data to be sent from the sending unit; a transmission bandwidth restriction unit configured to restrict the bandwidth controlled by the transmission bandwidth controller in such a manner that a data size of data for which no acknowledgement is received from the receiver apparatus among data which is sent is equal to or smaller than an upper limit size determined from the receive window size; and a switching controller configured to switch activation and inactivation of the transmission bandwidth restriction unit based on the data size and the receive window size.

An aspect of this invention increases the throughput in data transmission.

DETAILED DESCRIPTION OF THE EMBODIMENTS

Hereinafter, embodiments of this invention will be described with reference to the accompanying drawings. It should be noted that the embodiments are merely examples to implement this invention and are not to limit the technical scope of this invention. Throughout the drawings, common elements are denoted by the same reference signs.

Embodiment 1

Figure 1:
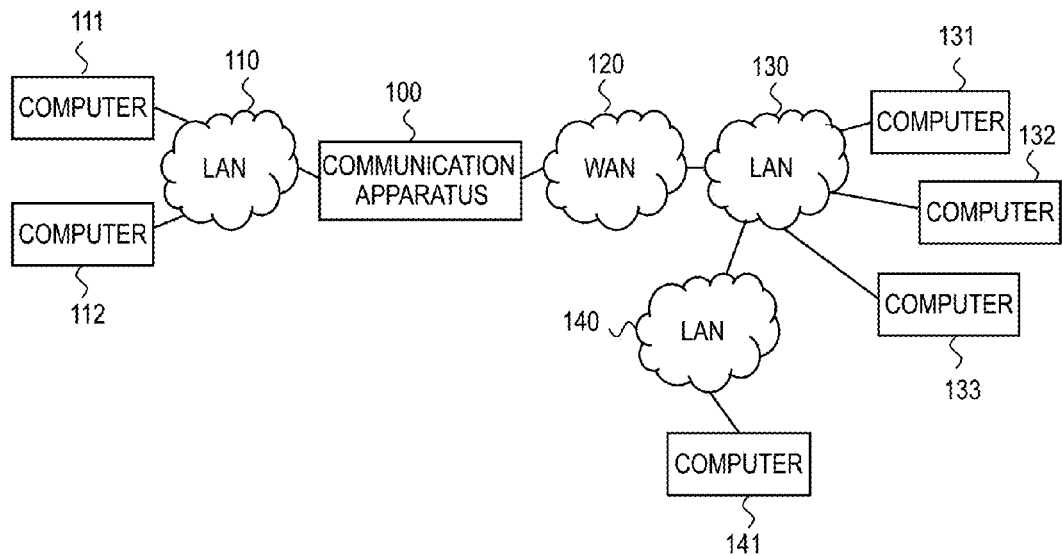
FIG. 1 is a configuration diagram of a network system including a communication apparatus in Embodiment 1.

Embodiment 1 describes a basic example. FIG. 1 is a configuration diagram of a network system including a communication apparatus 100 in this embodiment. The communication apparatus 100 is installed on a communication line connecting a LAN 110 and a WAN 120. A LAN 130 and a LAN 140 are connected with the communication apparatus 100 via the WAN 120.

Computers 111 and 112 are connected with the communication apparatus 100 via the LAN 110. Computers 131, 132, and 133 are connected with the LAN 130. A computer 141 is connected with the LAN 140. The WAN 120 includes a network connecting distant sites or a network showing high latency in site-to-site communication, compared to the LANs.

Hereinafter, communication based on Transmission Control Protocol (TCP) is described by way of example. TCP is a transport control protocol corresponding to the transport layer in the OSI model. Although the communication control described in this embodiment is suitable for TCP communication, it is applicable to other communication schemes; the apparatuses to send and receive data do not need to be computers.

For example, in a case where the computer 111 connected with the LAN 110 sends data to the computer 131 via the WAN 120 using TCP communication, the communication apparatus 100 controls the data transmission bandwidth with a unique TCP function included in the communication apparatus 100. If the receiver computer is available to receive data more than the RWIN specified by the receiver computer to the sender computer, the transmission bandwidth control of the unique TCP performs transmission bandwidth control not limited by the RWIN to send data more speedily.

Hereinafter, an example of transmission bandwidth control using the unique TCP function will be described in detail. The numbers of computers, communication apparatuses, and networks are not limited to the numbers shown in the drawings and may be any numbers. The computers include servers, proxy apparatuses, information processing apparatuses, terminals, mobile information processing terminals, smartphones, and tablet computers. Communication between computers includes data transfer between client servers, file transfer between information processing apparatuses, and screen transfer under remote access. The networks may be a bandwidth-guaranteed network or a bandwidth-unguaranteed network.

Figure 2:
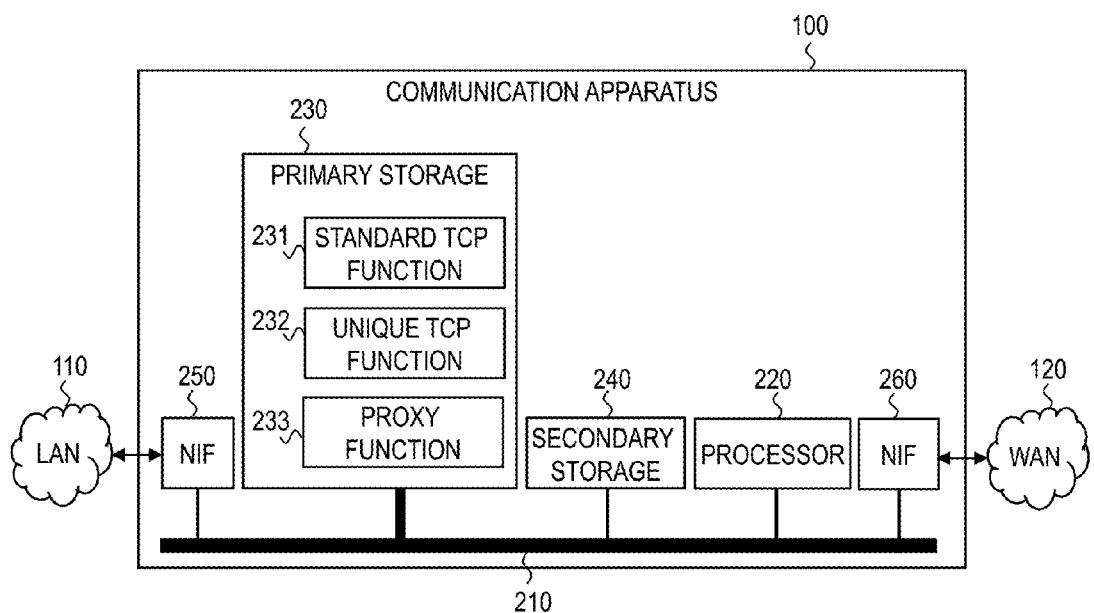
FIG. 2 is a hardware configuration diagram of a communication apparatus in Embodiment 1.

FIG. 2 illustrates an example of a hardware configuration of the communication apparatus 100 in this embodiment. The communication apparatus 100 includes a primary storage 230, a secondary storage 240, a processor 220, a network interface (NIF) 250, an NIF 260, and a system bus 210 connecting these components with one another to transfer data.

The primary storage 230 stores programs and data on a temporary basis to read and write data. The secondary storage 240 stores programs and data on a long-term basis and loads the programs and the data to the primary storage 230 as necessary. The processor 220 executes the programs in the primary storage 230, processes the data in the primary storage 230, and writes the result to the primary storage 230.

The primary storage 230 stores programs such as a standard TCP function 231, a unique TCP function 232, and a proxy function 233. The standard TCP function 231 sends data received from the proxy function 233 to the LAN 110 through the NIF 250 and forwards data received from the LAN 110 through the NIF 250 to the proxy function 233.

The unique TCP function 232 sends data received from the proxy function 233 to the WAN 120 through the NIF 260 and forwards data received from the WAN 120 through the NIF 260 to the proxy function 233. The proxy function 233 forwards data received from the standard TCP function 231 to the unique TCP function 232 and forwards data received from the unique TCP function 232 to the standard TCP function 231.

For example, assume that the computer 111 sends data to the computer 131. For the LAN 110 or the path from the computer 111 to the communication apparatus 100, the computer 111 controls the transmission bandwidth with the standard TCP. For the WAN 120 and the LAN 130 or the path from the communication apparatus 100 to the computer 131, the communication apparatus 100 controls the transmission bandwidth with the unique TCP. Even in the case where the RWIN specified by the computer 131 is small, if the computer 131 is available to receive more data, the communication apparatus 100 controls the transmission bandwidth using the unique TCP to provide a broader communication bandwidth.

FIG. 2 provides an example where the processor 220, the primary storage 230, the secondary storage 240, the NIF 250, and the NIF 260 are connected by a single system bus 210. These components may be connected by multiple system buses or directly connected without using the system bus. The numbers of processors, primary storages, secondary storages, and NIFs included in the communication apparatus 100 may be different from the numbers shown in the drawing.

FIG. 2 provides an example where the standard TCP function 231, the unique TCP function 232, and the proxy function 233 are all configured with software. A part or all of these functions may be implemented in one or more of the components of the processor 220, the NIF 250, and the NIF 260. The NIFs 250 and 260 may be logical NIFs implemented in one physical NIF.

Figure 3:
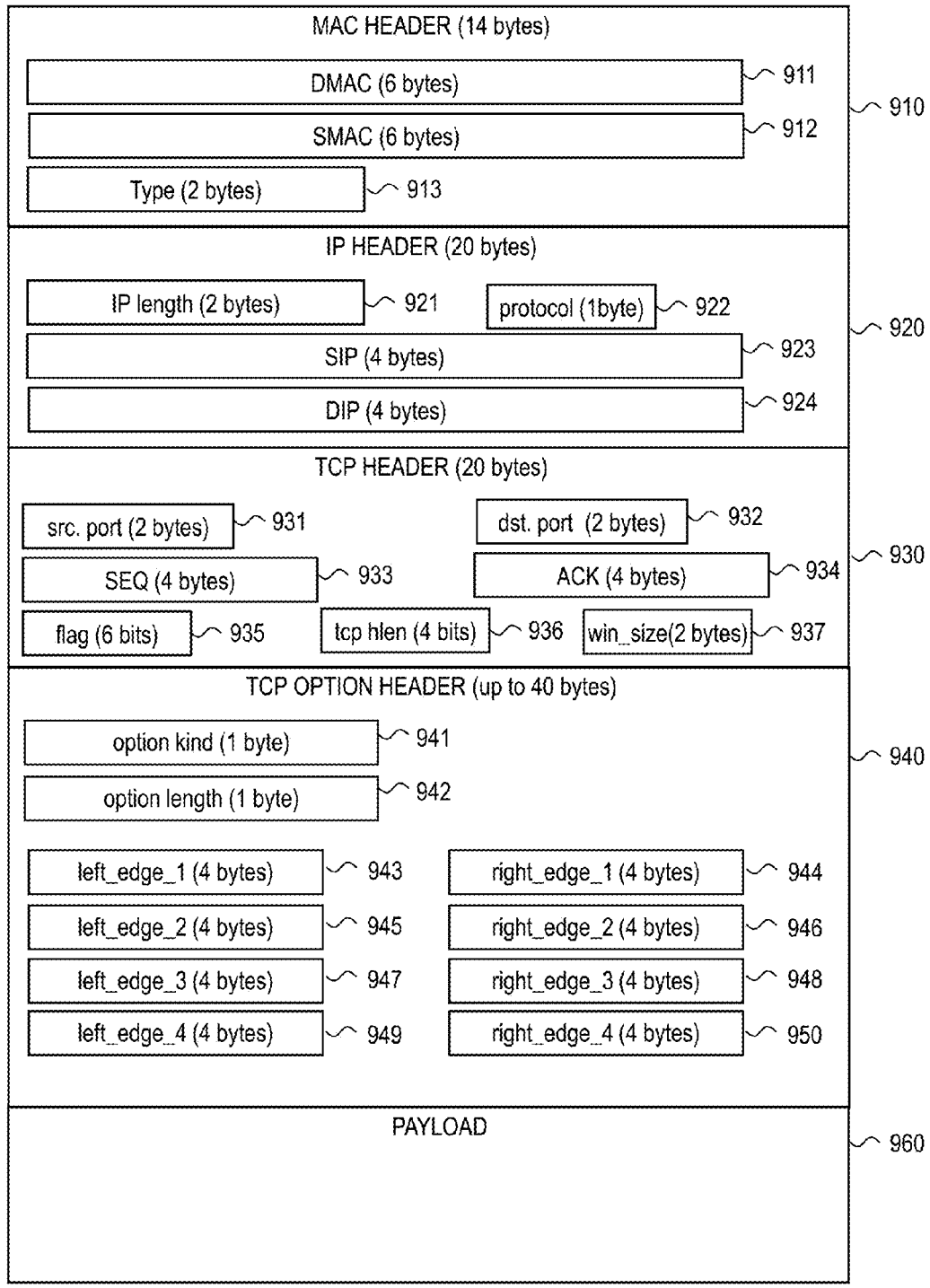
FIG. 3 is a format of a TCP packet.

FIG. 3 is a format diagram of a packet to be sent and received by the communication apparatus 100. The packet includes a MAC header 910, an IP header 920, a TCP header 930, a TCP option header 940, and a payload 960.

The MAC header 910 includes a DMAC 911 for indicating a destination MAC address, an SMAC 912 for indicating a source MAC address, a Type 913 for indicating a MAC frame type. The IP header 920 includes an IP length 921 for indicating a packet length excluding the MAC header 910, a protocol 922 for indicating a protocol number, an SIP 923 for indicating a source IP address, and a DIP 924 for indicating a destination IP address.

The TCP header 930 includes an src.port 931 for indicating a source port number, a dest.port 932 for indicating a destination port number, a SEQ 933 for indicating a sequence number of a packet being sent, an ACK 934 for indicating the sequence number of a packet to be received, a flag 935 for indicating TCP flag numbers, a tcp hlen 936 for indicating a TCP header length, and a win_size 937 for notifying the sender computer of the RWIN.

The TCP option header 940 includes an option kind 941 for indicating the kind of the option, an option length 942 for indicating the length of the option, left_edge_1 to_4 (943, 945, 947, and 949) and right_edge_1 to_4 (944, 946, 948, and 950) to be used to inform the sender computer of the positions of received data blocks.

For example, the MSS (Maximum Segment Size) option is used to inform the other apparatus of an MSS available to receive when starting TCP communication. The SACK (Selective ACKnowledgement) option is used to inform the other apparatus that the apparatus supports the SACK option when starting TCP communication. The SACK option is further used to inform the other apparatus of the positions of the data blocks that have been received partially when loss is detected during the session.

The timestamp option is used to inform the other apparatus of the time of receipt at the apparatus in the session. The window scale option is used to inform the other apparatus of the number of bits to left-shift the value in the win_size 937 so that the other apparatus can be informed of an RWIN larger than the maximum value. As described above, the TCP option is used to inform the other apparatus of a function supported by the apparatus or information when starting or during a session.

Figure 4:
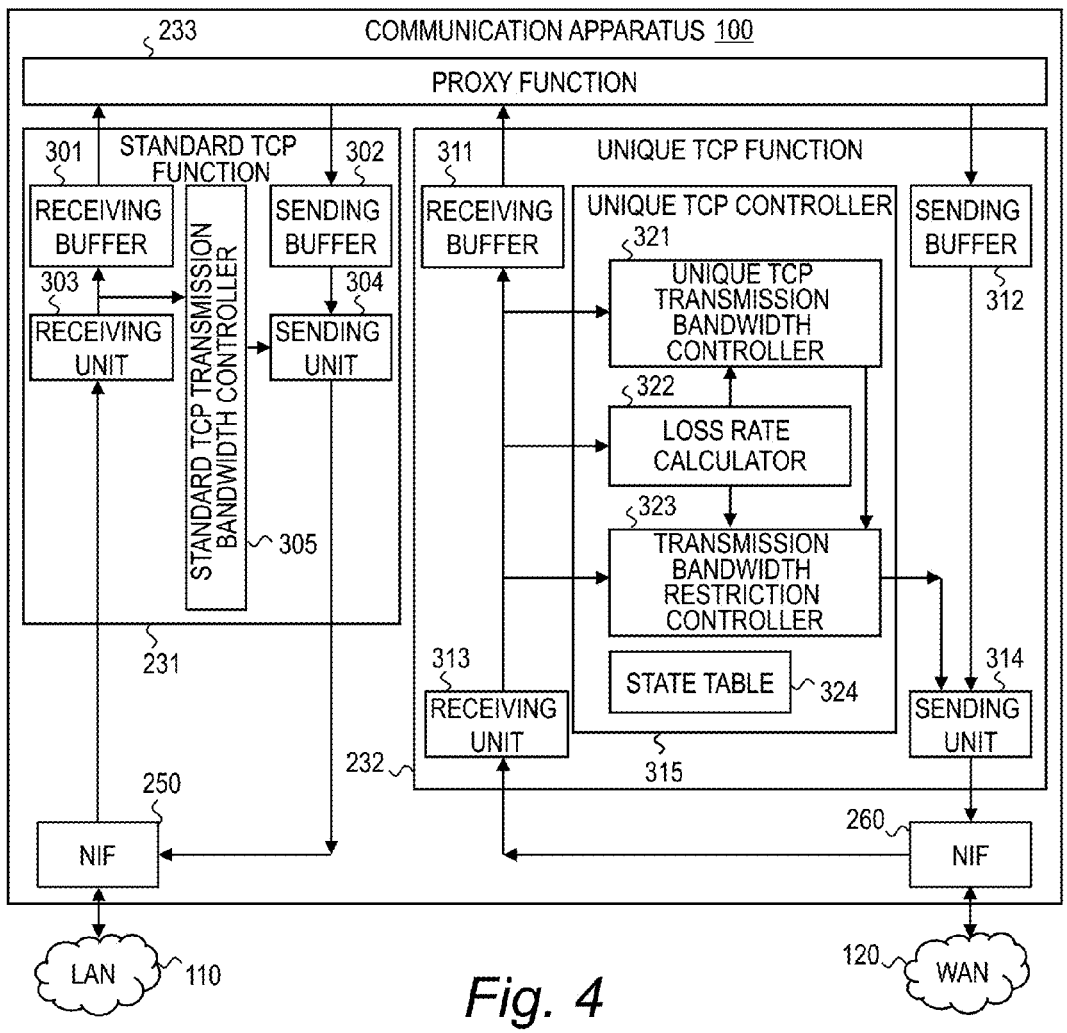
FIG. 4 is a functional block diagram of the communication apparatus in Embodiment 1.

FIG. 4 provides a detailed example of a function block configuration of the communication apparatus 100 in this embodiment. The communication apparatus 100 includes a standard TCP function 231, a unique TCP function 232, a proxy function 233, an NIF 250, and an NIF 260.

The proxy function 233 transfers data between the buffers 301 and 302 of the standard TCP function 231 and the buffers 311 and 312 of the unique TCP function 232. The proxy function 233 uses the standard TCP function 231 and the unique TCP function 232 in TCP communication passing through the communication apparatus 100.

Specifically, the proxy function 233 uses the standard TCP function 231 in the communication between the LAN 110 and the NIF 250 and uses the unique TCP function 232 in the communication between the WAN 120 and the NIF 260. The proxy function 233 switches bandwidth control modes so that the TCP communication controlled by the standard TCP in the LAN 110 will be controlled by the unique TCP in the WAN 120.

The standard TCP function 231 includes a receiving buffer 301, a sending buffer 302, a receiving unit 303, a sending unit 304, and a standard TCP transmission bandwidth controller 305. The receiving buffer 301 checks the consistency of the order of data received by the receiving unit 303 and forwards the data to the proxy function 233. The sending buffer 302 buffers data sent from the proxy function 233 on a temporary basis, holds the data to resend if packet loss occurs, and forwards necessary data to the sending unit 304.

The receiving unit 303 receives data arrived at the NIF 250 from the LAN 110. The sending unit 304 sends data from the NIF 250 to the LAN 110 in accordance with the standard TCP transmission bandwidth controller 305. The standard TCP transmission bandwidth controller 305 controls the bandwidth for the sending unit 304 to send data using the algorithm specified in IETF RFC 793.

The unique TCP function 232 includes a receiving buffer 311, a sending buffer 312, a receiving unit 313, a sending unit 314, and a unique TCP controller 315. The receiving buffer 311 checks the consistency of the order of data received by the receiving unit 313 and forwards the data to the proxy function 233. The sending buffer 312 buffers data sent from the proxy function 233 on a temporary basis, holds the data to resend if packet loss occurs, and forwards necessary data to the sending unit 314.

The receiving unit 313 receives data arrived at the NIF 260 from the WAN 120. The sending unit 314 sends data from the NIF 260 to the WAN 120 in accordance with the unique TCP controller 315. The unique TCP controller 315 controls the bandwidth for the sending unit 314 to send data.

The unique TCP controller 315 includes a unique TCP transmission bandwidth controller 321, a loss rate calculator 322, a transmission bandwidth restriction controller 323, and a status table 324. The status table 324 stores values necessary to execute the unique TCP function. The unique TCP transmission bandwidth controller 321 calculates data transmission rate for the sending unit 314 based on the data received from the receiving unit 313 and the loss rate received from the loss rate calculator 322.

The loss rate calculator 322 calculates the loss rate of the packets sent from the sending unit 314 based on the data received from the receiving unit 313. The transmission bandwidth restriction controller 323 controls the bandwidth for the data to be sent from the sending unit 314 based on the data received from the receiving unit 313 and the loss rate received from the loss rate calculator 322.

When the transmission bandwidth restriction function of the transmission bandwidth restriction controller 323 is on, this function controls the bandwidth so that the inflight will not exceed $\delta$ times the RWIN received from the receiving unit 313. The inflight is the size of the data for which ACK packets have not been received from the receiving unit 313 out of the data sent from the sending unit 314. The value of $\delta$ will be described later.

Figure 5:
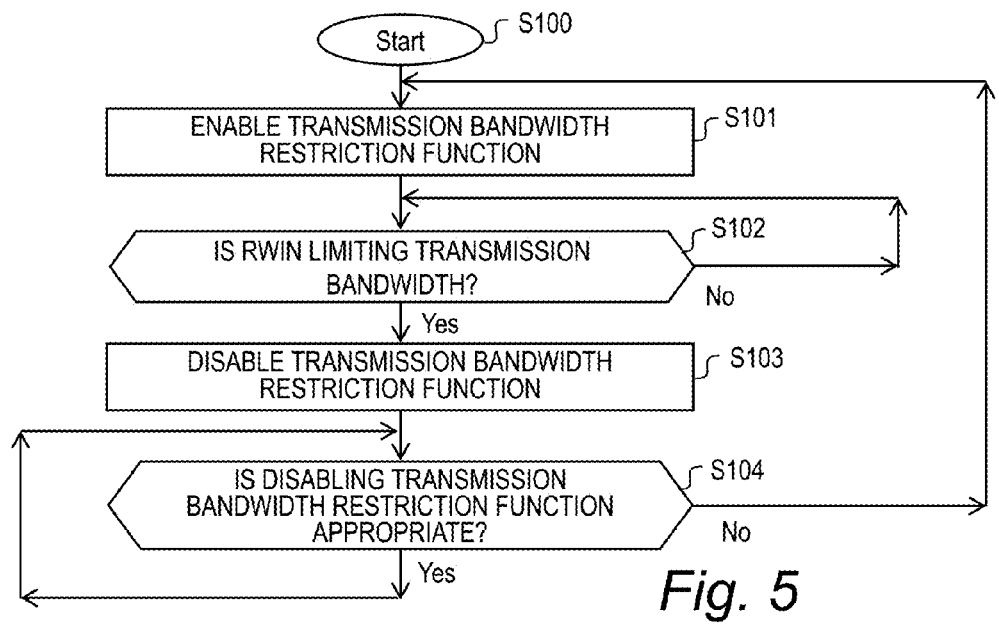
FIG. 5 is a flowchart of an outline of operation of a unique TCP in Embodiment 1.

FIG. 5 is a flowchart of an outline of operation of the unique TCP controller 315 included in the communication apparatus 100 in this embodiment. The communication apparatus 100 enables the transmission bandwidth restriction function to prevent buffer overflow in the receiver computer. The communication apparatus 100 disables the transmission bandwidth restriction function to prevent the transmission bandwidth from being limited by the RWIN specified by the receiver computer.

The communication apparatus 100 switches on and off of the transmission bandwidth restriction function during communication to speed up data transmission. If the transmission bandwidth is not limited by the RWIN without disabling the transmission bandwidth restriction function, the communication apparatus 100 enables the transmission bandwidth restriction function to prevent degradation in communication bandwidth by preventing the buffer overflow in the receiver computer.

When the buffer of the receiving computer is not overflowing and the transmission bandwidth is limited by the RWIN, the communication apparatus 100 disables the transmission bandwidth restriction function to further broaden the transmission bandwidth. The communication apparatus 100 dynamically switches on and off of this function to achieve higher-speed data communication depending on the conditions of the receiver computer and the network.

With reference to FIG. 5, the outline of operation of the communication apparatus 100 is described. Details will be described later. When the communication apparatus 100 is activated (S100), the unique TCP controller 315 enables the transmission bandwidth restriction function to start (S101). This is because, since the operating system of the receiver computer may dynamically change the RWIN, the transmission bandwidth may be broadened because of the enlarged RWIN even if the transmission bandwidth restriction function is not disabled. Maintaining the transmission bandwidth restriction function prevents buffer overflow in the receiver computer more unfailingly.

The unique TCP controller 315 keeps determining whether the transmission bandwidth is limited by the RWIN. Upon determination that the RWIN is limiting the transmission bandwidth (S102), the unique TCP controller 315 disables the transmission bandwidth restriction function so that the transmission bandwidth will not be limited by the RWIN (S103).

After disabling the transmission bandwidth restriction function (S103), the unique TCP controller 315 keeps determining whether the disabling the transmission bandwidth restriction function is appropriate (S104). The conditions to determine at Step S104 that the disabling the transmission bandwidth restriction function is inappropriate are as follows.

(1) If the unique TCP controller 315 detects congestion of the network when the transmission bandwidth restriction function is off, the unique TCP controller 315 determines that the disabling the transmission bandwidth restriction function is inappropriate. This determination maintains the fairness in communication bandwidth with the other standard TCP communication in which the transmission bandwidth is limited by an RWIN.

(2) If the unique TCP controller 315 detects buffer overflow in the receiver computer, the unique TCP controller 315 determines that the disabling the transmission bandwidth restriction function is inappropriate. Enabling the transmission bandwidth restriction function prevents buffer overflow in the receiving computer.

(3) If the transmission bandwidth does not significantly change for a long time after either enabling or disabling the transmission bandwidth restriction function, the unique TCP controller 315 determines that the enabling the transmission bandwidth restriction function is appropriate and that the disabling the transmission bandwidth restriction function is inappropriate. Enabling the transmission bandwidth restriction function prevents buffer overflow in the receiving computer.

If determining that the disabling the transmission bandwidth restriction function is inappropriate in view of the foregoing criteria (S104: No), the unique TCP controller 315 enables the transmission bandwidth restriction function (S101). Although three conditions are provided to determine that the disabling the transmission bandwidth restriction function is inappropriate, the unique TCP controller 315 may use all the conditions, a part of the conditions, or other conditions.

Figure 6:
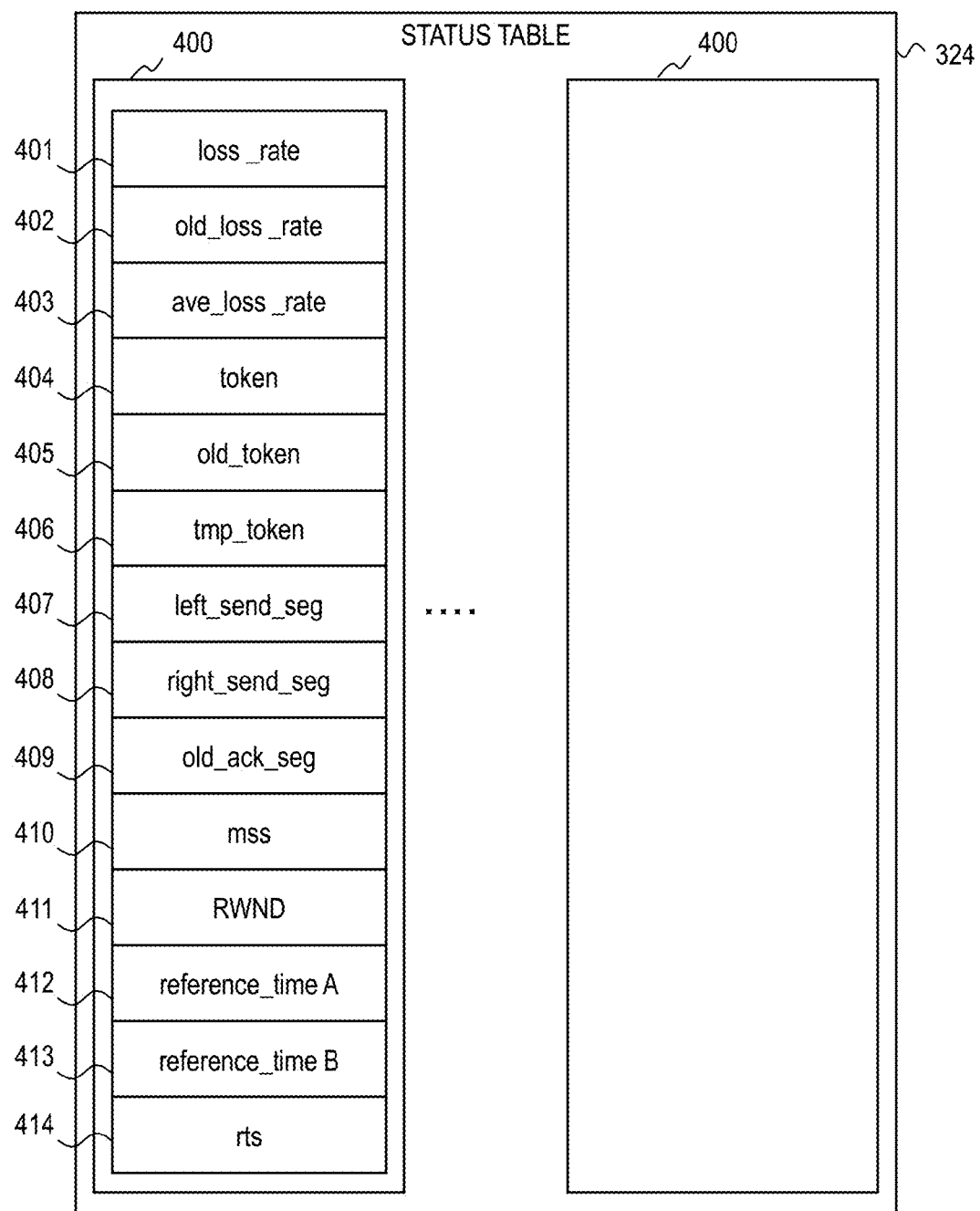
FIG. 6 is an example of a status table for the unique TCP in Embodiment 1.

FIG. 6 is an example of a status table 324. The status table 324 has n entries 400 to record the statuses of individual TCP connections, for example. An example of the information included in each entry 400 is as follows.

The loss_rate 401 indicates the latest loss rate calculated by the loss rate calculator 322. The old_loss_rate 402 indicates the previous loss rate that had been stored in the loss_rate 401 until the loss_rate 401 is updated. The ave_loss_rate 403 indicates an average loss_rate represented by the moving average of the loss_rates 401 of M entries. The value of M will be described later.

The token 404 indicates the current tokens in the token bucket. The old_token 405 indicates the previous tokens or the value of the token 404 before the tokens in the token bucket are updated. The tmp_token 406 indicates temporary tokens that are stored on a temporary basis when a value of the token 404 is moved to the old_token 405.

The left_send_seg 407 indicates the left-edge pointer, which is a pointer to the data sent and acknowledged in the sending buffer 312. The right_send_seg 408 indicates the right-edge pointer, which is a pointer to the data sent but not acknowledged in the sending buffer 312. The old_ack_seg 409 indicates the previous ACK number, which is the ACK number of the last ACK packet before the token 404 is updated. The mss 410 indicates the maximum segment size representing the maximum payload size in the current TCP session being processed.

The RWND 411 indicates the RWIN included in the latest ACK packet forwarded by the receiving unit 313. The reference_time A 412 stores the time to be the reference to update the tokens next time. The reference time may be the update time of the token bucket. The reference_time B 413 stores the latest time when the inflight becomes $\alpha$ times the RWIN or more. The value of $\alpha$ will be described later. The rts 414 is a counter to store the number of packets requested to be resent.

Figure 7:
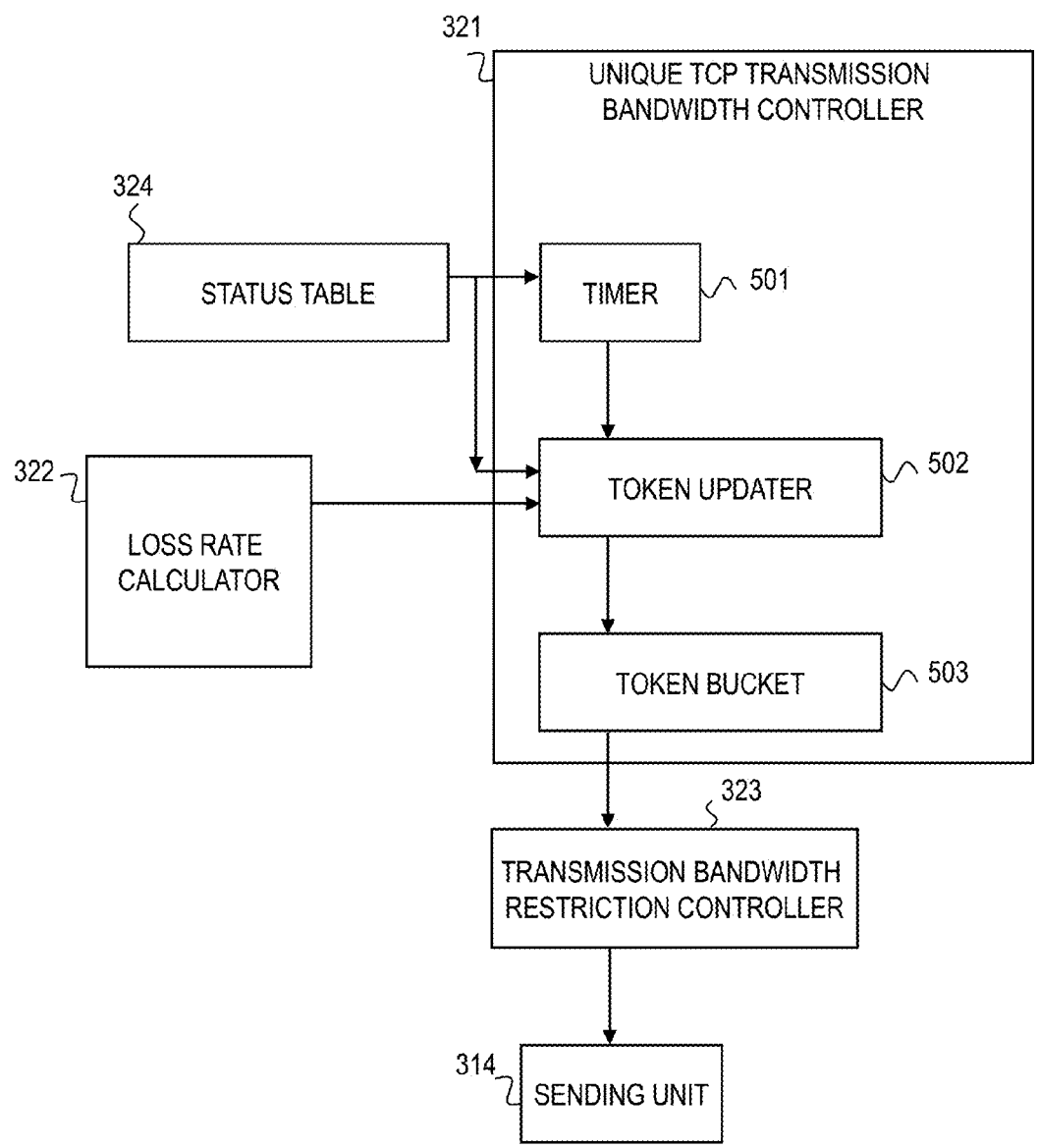
FIG. 7 is a functional block diagram of a unique TCP transmission bandwidth controller in Embodiment 1.

FIG. 7 illustrates an example of a function block configuration of the unique TCP transmission bandwidth controller 321. The unique TCP transmission bandwidth controller 321 in this embodiment uses a token bucket algorithm. The token bucket algorithm accumulates tokens in a token bucket. If the tokens in the token bucket correspond to a packet length longer than that of the packet to be sent, the token bucket algorithm sends the packet.

Upon sending the packet, the token bucket algorithm decreases the tokens corresponding to the packet length from the token bucket. The unique TCP transmission bandwidth controller 321 includes a timer 501, a token bucket 503, and a token updater 502 for calculating tokens to implement the token bucket algorithm in this embodiment. The unique TCP transmission bandwidth controller 321 controls the bandwidth appropriately even if the transmission bandwidth restriction function is off.

Figure 8:
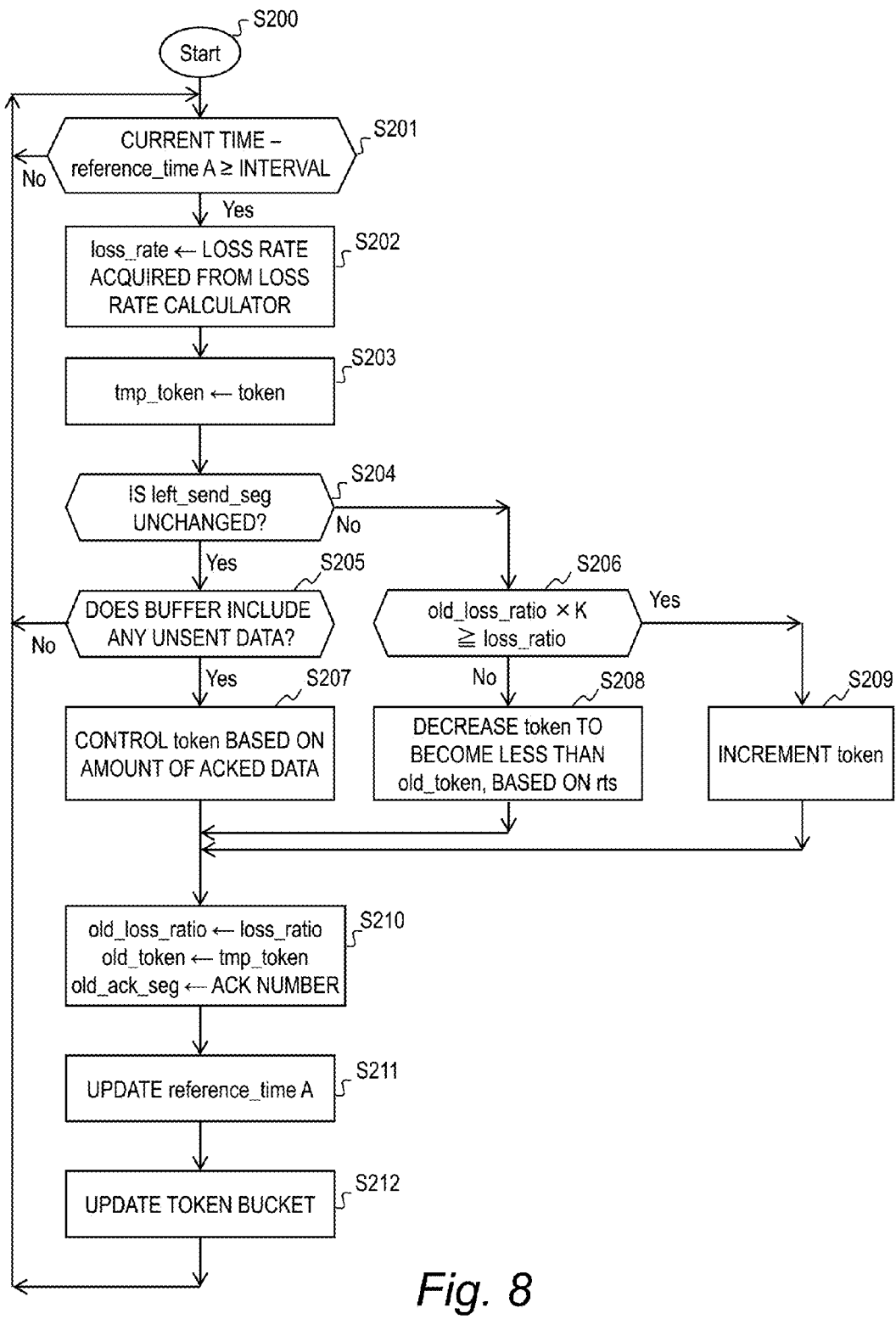
FIG. 8 is a flowchart of operation of the unique TCP transmission bandwidth controller in Embodiment 1.

FIG. 8 is a flowchart of an example of operation of the unique TCP transmission bandwidth controller 321. The token bucket algorithm in this embodiment increases or decreases the tokens in the token bucket depending on the loss rate after each interval. This control lowers the loss rate. The unique TCP transmission bandwidth controller 321 may control the transmission bandwidth using an algorithm different from the following bandwidth control.

Upon starting the processing (S200), the unique TCP transmission bandwidth controller 321 monitors the current time with the timer 501 (S201). Specifically, the unique TCP transmission bandwidth controller 321 determines whether the difference between the current time and the reference_time A 412 is a predetermined interval or more. The interval may be a measured RTT.

If the difference between the current time and the reference_time A 412 is the interval or more (S201: Yes), the unique TCP transmission bandwidth controller 321 stores the loss_rate acquired from the loss_rate calculator 322 to the loss_rate 401 (S202). The unique TCP transmission bandwidth controller 321 saves the value of the token 404 to the tmp_token 406 (S203).

Next, the unique TCP transmission bandwidth controller 321 checks whether the value of the left_send_seg 407 is unchanged (S204). If the value is unchanged (S204: Yes), the unique TCP transmission bandwidth controller 321 checks whether the sending buffer 312 includes unsent data (S205).

If no unsent data exists (S205: No), the unique TCP transmission bandwidth controller 321 returns to Step S201. If unsent data exists (S205: Yes), the unique TCP transmission bandwidth controller 321 sets the amount of ACKed data received since the reference_time A 412 (current ACK number—old_ack_seg 409) to the token 404 (S207).

If the value of the left_send_seg 407 has advanced at Step S204 (S204: No), the unique TCP transmission bandwidth controller 321 determines whether the value of K times the old_loss_rate 402 is equal to or more than the loss_rate 401

(S206). The value of K is a predetermined constant or variable. The value of K is not less than one or less than one, and may be one in an example.

If the value of K times the old_loss_rate 402 is less than the loss_rate 401 (S206: No), the unique TCP transmission bandwidth controller 321 decreases the token 404 to become less than the old_token 405, based on the counter rts 414. For example, the unique TCP transmission bandwidth controller 321 changes the token 404 to (old_token 405—rts 414) (S208).

If the value of K times the old_loss_rate 402 is equal to or more than the loss_rate 401 (S206: Yes), the unique TCP transmission bandwidth controller 321 increments the token 404 by a predetermined amount (S209). The increment is a constant or a variable.

After Steps S207, S208, or S209, the unique TCP transmission bandwidth controller 321 replaces the old_loss_rate 402 with the loss_rate 401, the old_token 405 with the tmp_token 406, and the old_ack_seg 409 with the current ACK number (S210). Furthermore, the unique TCP transmission bandwidth controller 321 updates the reference_time A 412 (S211). The unique TCP transmission bandwidth controller 321 updates the reference_time A 412 with the current time, for example. The updated time may be another time. The unique TCP transmission bandwidth controller 321 updates the token bucket with the updated value of the token 404 (S212). The unique TCP transmission bandwidth controller 321 may control the transmission bandwidth with a method different from the method as described above.

Figure 9:
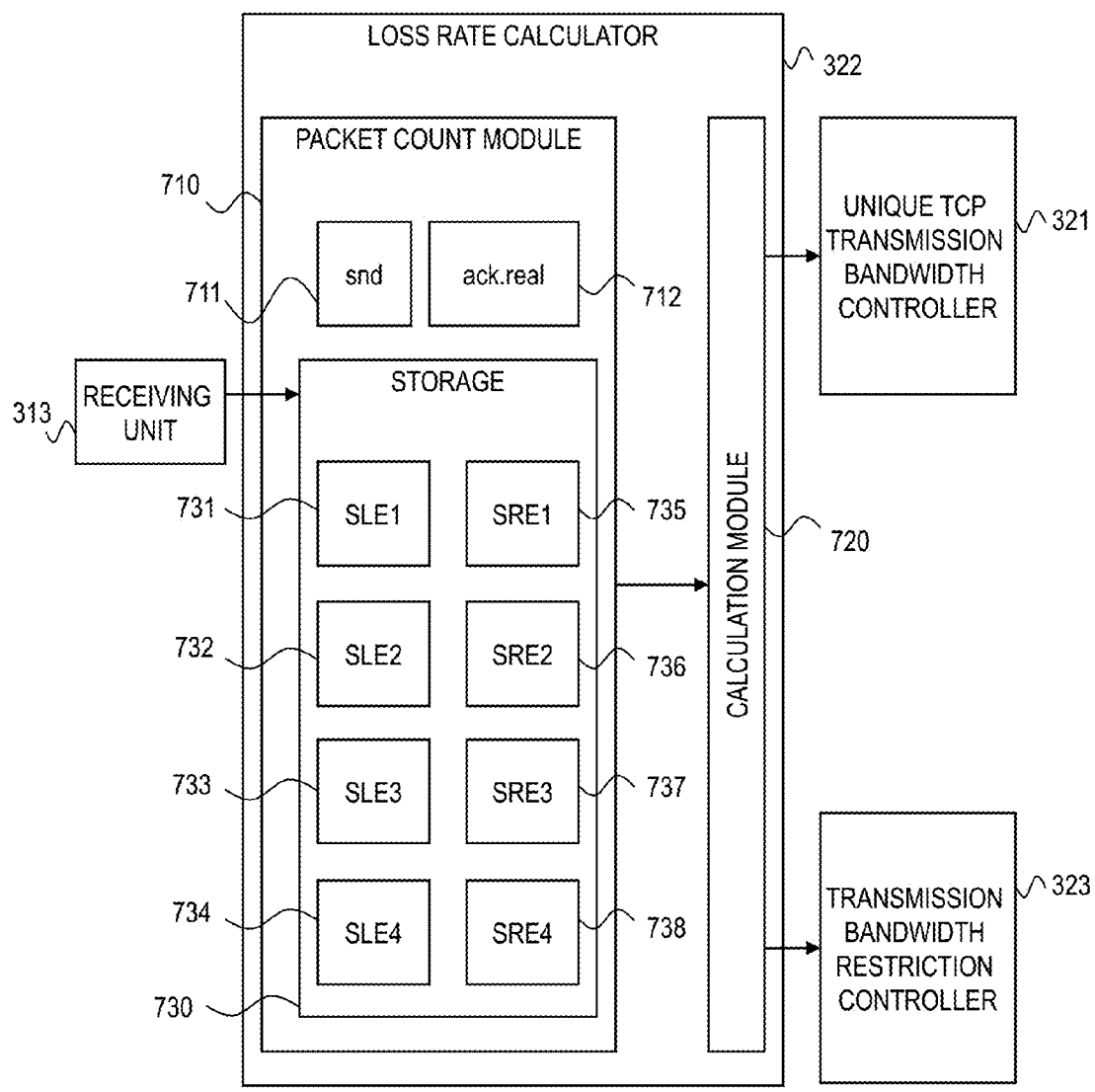
FIG. 9 is a functional block diagram of a loss rate calculator in Embodiment 1.

FIG. 9 illustrates an example of a function block configuration of the loss rate calculator 322. The configuration and the method described hereinafter provide an example of loss rate calculation; the loss rate may be calculated with another configuration and another method. The loss rate calculator 322 includes a packet count module 710 and a calculation module 720. The packet count module 710 includes a counter snd 711, a counter ack.real 712, and a storage 730. The counter snd 711 counts packets sent from the sending unit 314. The counter ack.real 712 counts ACKed or SACKed packets. The storage 730 stores previous SACK blocks.

In the storage 730, the SLE1 731 indicates the beginning point (SACK Left Edge: SLE) of the first block in the SACK option field. The SRE1 735 indicates the end point (SACK Right Edge: SRE) of the same. The SLE2 732, SLE3 733, and SLE4, 734 respectively indicate the beginning points of the second, the third, and the fourth blocks. The SRE2 736, SRE3 737, and SRE4 738 respectively indicate the end points of the second, the third, and the fourth blocks.

Figure 10:
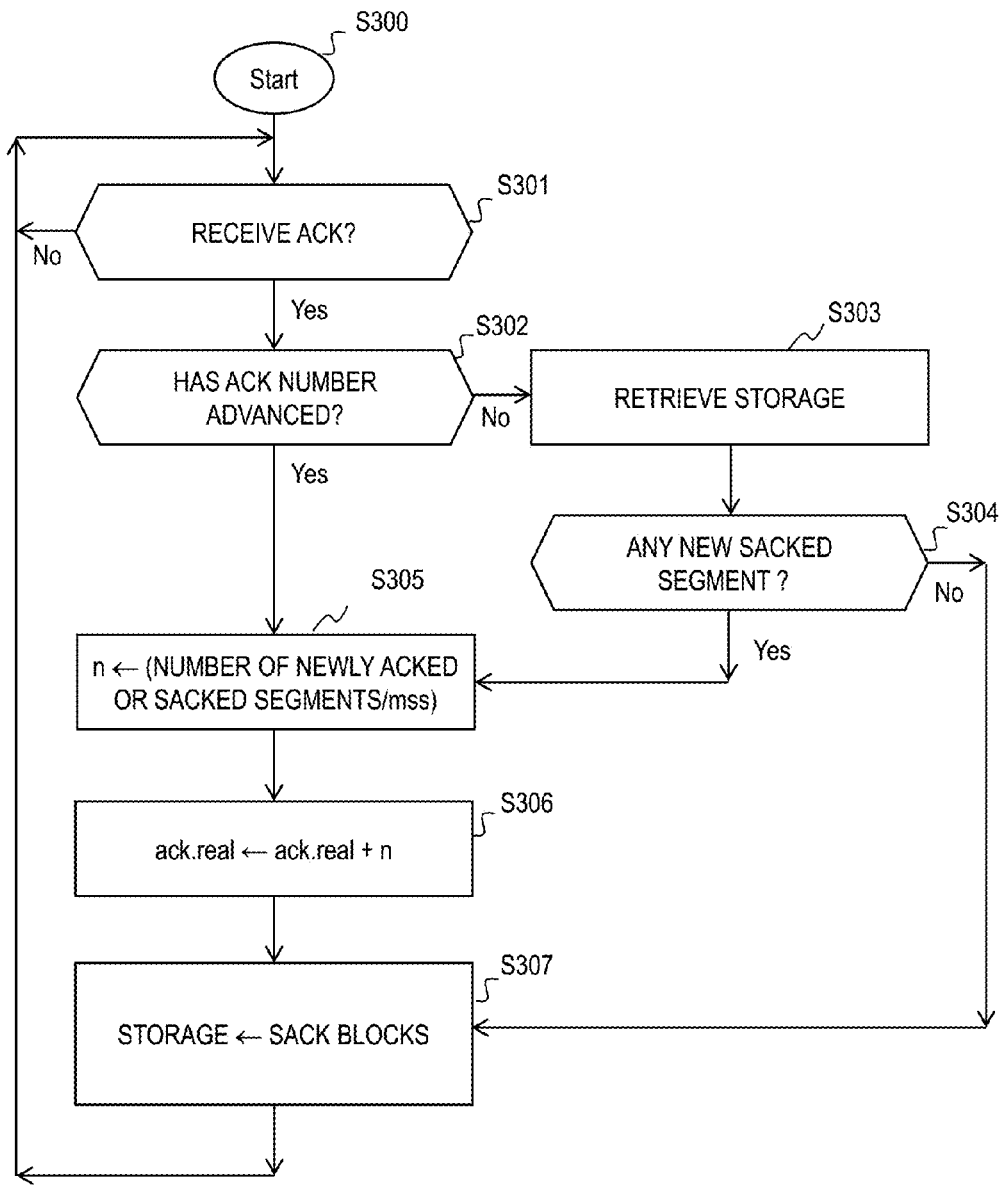
FIG. 10 is a flowchart of operation of the loss rate calculator in Embodiment 1.

FIG. 10 is a flowchart of an example of operation of the loss rate calculator 322. After starting the processing (S300), upon each receipt of an ACK packet (S301), the packet count module 710 determines whether the ACK number has advanced (S302). If the ACK number has not advanced (S302: No), the packet count module 710 retrieves the values (SLE1 to SLE4 and SRE1 to SRE4) of the previous SACK from the storage 730 (S303).

The packet count module 710 determines whether the values of the SACK have changed (S304). Specifically, the packet count module 710 determines whether the number of the right edge of any SACK block has decreased, whether the number of the right edge of any SACK block has increased, or whether two or more blocks have become contiguous.

If the ACK number or the values of the SACK have changed (S302: Yes or S304: Yes), the packet count module 710 calculates the number of segments corresponding to the difference and divides the obtained number by the value of the mss 410 to calculate the number of packets newly received by the receiver computer (S305). The packet count module 710 adds this value to the counter ack.real 712 (S306). The packet count module 710 stores the values of the SACK blocks to the storage 730 (S307) and returns to the beginning. The calculation unit 720 calculates the value of the loss_rate 401 by (1—ack.real 712/snd 711).

Figure 11:
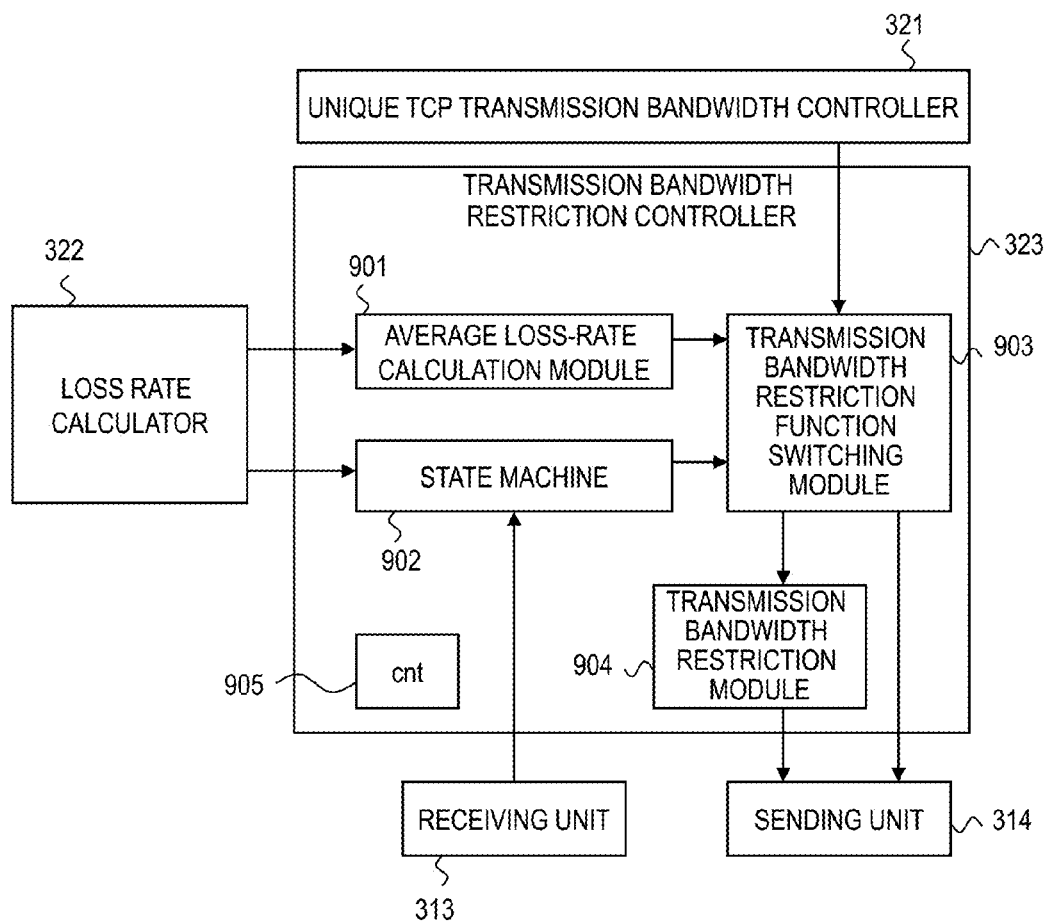
FIG. 11 is a functional block diagram of a transmission bandwidth restriction controller in Embodiment 1.

FIG. 11 illustrates an example of a function block configuration of the transmission bandwidth restriction controller 323. The transmission bandwidth restriction controller 323 includes an average loss-rate calculation module 901, a state machine 902, a transmission bandwidth restriction function switching module 903, a transmission bandwidth restriction module 904, and a counter cnt 905. The state machine 902 and the transmission bandwidth restriction function switching module 903 constitute an example of a switching controller.

The average loss-rate calculation module 901 calculates the moving average ave_loss_rate 403 of M loss_rates 401 calculated by the loss rate calculator 322 after M intervals. The state machine 902 operates based on the information received from the receiving unit 313 and the loss rate calculator 322. The value of M may be either fixed or variable. For example, the average loss-rate calculation module 901 may vary the value of M in inverse proportion to the RTT.

The transmission bandwidth restriction function switching module 903 determines whether to enable or disable the transmission bandwidth restriction function based on the ave_loss_rate 403 calculated by the average loss-rate calculation module 901 and the state of the state machine 902. In this example, enabling or disabling the transmission bandwidth restriction function is controlled by whether to bypass the transmission bandwidth restriction module 904; another operation may be used.

When the transmission bandwidth restriction function is off, the transmission bandwidth restriction module 904 informs the sending unit 314 that the bandwidth calculated by the unique TCP transmission bandwidth controller 321 is the controlled bandwidth. The bandwidth calculated by the unique TCP transmission bandwidth controller 321 corresponds to the amount of tokens in the token bucket 503 in this example. When the transmission bandwidth restriction function is on, the transmission bandwidth restriction module 904 informs the sending unit 314 that the narrower bandwidth between the bandwidth calculated by the unique TCP transmission bandwidth controller 321 and the bandwidth in which the inflight becomes equal to δ times the RWIN is the controlled bandwidth.

The counter cnt 905 is used to control the state machine 902. The value of δ may be fixed or variable but not more than one. For example, the transmission bandwidth restriction module 904 may vary the value of δ in inverse proportion to the loss_rate 401.

Figure 12:
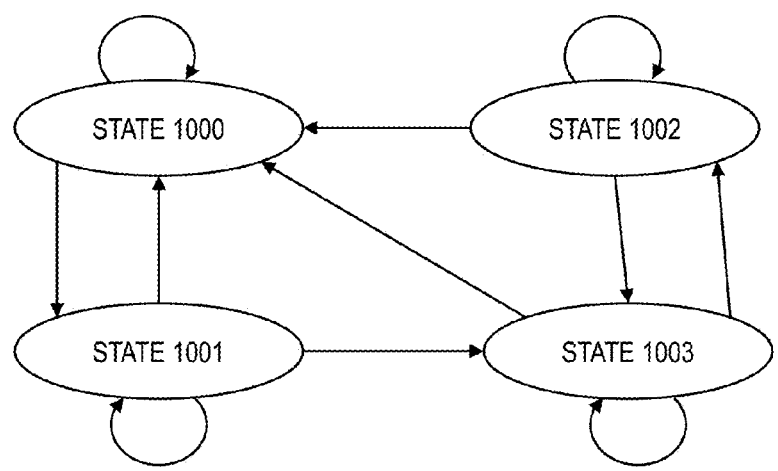
FIG. 12 is a state transition diagram of a state machine to be used by the transmission bandwidth restriction controller in Embodiment 1.

FIG. 12 is a state transition diagram of the state machine 902. The state machine 902 can change its state from the origin to the end of each arrow. The state machine 902 takes one of the four states. In the state 1003, the transmission bandwidth restriction function switching module 903 is permitted to disable the transmission bandwidth restriction function.

In the state 1000, the transmission bandwidth restriction function is on in view of the determination that the RWIN does not limit the transmission bandwidth or that disabling the transmission bandwidth restriction function is inappropriate. In the state 1001, the transmission bandwidth restriction function is on in view of the determination that the RWIN limits the transmission bandwidth. In the state 1002, the transmission bandwidth restriction function is temporarily on as the RWIN is changing.

Figure 13:
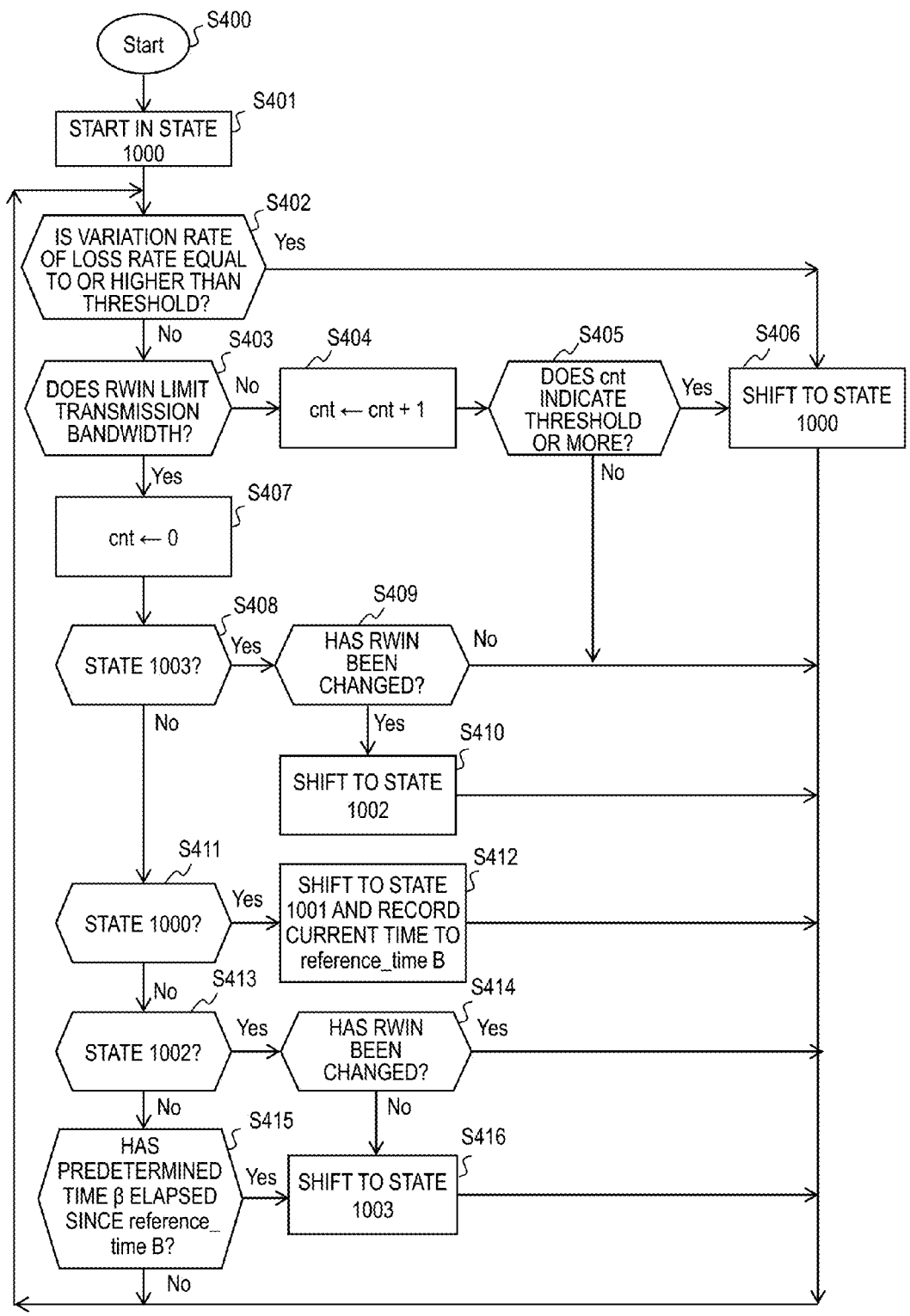
FIG. 13 is a flowchart of operation of the state machine to be used by the transmission bandwidth restriction controller in Embodiment 1.

FIG. 13 is a flowchart of operation of the state machine 902. State transitions of the state machine 902 are described with this flowchart. Upon activation of the communication apparatus 100 (S400), the state machine 902 starts in the state 1000 (S401).

The state machine 902 determines whether the variation rate of the loss rate calculated by the loss rate calculator 322 is equal to or higher than a threshold (S402). Specifically, the state machine 902 determines whether the value of the loss_rate 401 is equal to or more than $\gamma$ times the value of the old_loss_rate 402.

If the variation rate of the loss rate is equal to or higher than the threshold (S402: Yes), the state machine 902 determines that the loss rate has increased because of the packet loss caused by occurrence of network congestion or occurrence of buffer overflow in the receiver computer. As described with reference to FIG. 5, disabling the transmission bandwidth restriction function is inappropriate when network congestion or buffer overflow is detected (criteria (1) and (2)). Accordingly, the state machine 902 shifts to the state 1000 (S406) and returns to Step S402.

If the value of the loss_rate 401 calculated by the loss rate calculator 322 is smaller than $\gamma$ times the value of the old_loss_rate 402 (S402: No), the state machine 902 determines whether the RWIN limits the transmission bandwidth (S403). Specifically, the state machine 902 compares the inflight with $\alpha$ times the RWIN.

If the inflight is smaller than $\alpha$ times the RWIN, the state machine 902 determines that the RWIN does not limit the transmission bandwidth (S403: No), and increments the counter cnt 905 by one (S404). If the counter cnt 905 indicates a threshold N or more (S405: Yes), the state machine 902 shifts to the state 1000 (S406) and returns to Step S402. If the counter cnt 905 indicates a value smaller than the threshold N (S405: No), the state machine 902 returns to Step S402.

If the inflight is equal to or larger than $\alpha$ times the RWIN, the state machine 902 determines that the RWIN limits the transmission bandwidth (S403: Yes) and resets the counter cnt 905 to zero (S407). To disable the transmission bandwidth restriction function when the specified conditions are satisfied after enabling the transmission bandwidth restriction function, $\alpha$ is a value greater than zero and not more than $\delta$.

If the current state is the state 1003 (S408: Yes), the state machine 902 determines whether the increase or decrease in RWIN is equal to or more than a threshold (S409). Specifically, the state machine 902 determines whether the increased amount or decreased amount from the previous RWIN to the current RWIN (hereinafter, referred to as increase or decrease) is Z % or more of the previous RWIN.

If the increase or decrease in RWIN is Z % or more (S409: Yes), the state machine 902 shifts to the state 1002 (S410) and returns to Step S402. If the increase or decrease is less than Z % (S409: No), the state machine 902 returns to Step S402. The state machine 902 may refer to only either one of the increase or decrease in RWIN or may use different thresholds for the increase and the decrease.

If the current state is not the state 1003 (S408: No), the state machine 902 determines whether the current state is the state 1000 (S411). If the current state is the state 1000 (S411: Yes), the state machine 902 shifts to the state 1001, records the current time to the reference_time B (S412), and returns to S402.

If the current state is not the state 1000 (S411: No), the state machine 902 identifies whether the current state is the state 1002 (S413). If the current state is the state 1002 (S413: Yes), the state machine 902 determines whether the increased or decreased amount from the previous RWIN to the current RWIN is Z % or more of the previous RWIN (S414).

If the increase or decrease in RWIN is Z % or more (S414: Yes), the state machine 902 returns to Step S402. If the increase or decrease in RWIN is less than Z % (S414: No), the state machine 902 shifts to the state 1003 (S416) and returns to Step S402.

If the current state is not the state 1002 (S413: No), the state machine 902 determines whether a time $\beta$ has elapsed since the reference_time B 413 (S415). If the time $\beta$ has elapsed (S415: Yes), the state machine 902 shifts to the state 1003 (S416) and returns to Step S402. If the time $\beta$ has not elapsed (S415: No), the state machine 902 returns to Step S402.

As described with reference to FIG. 5, it is appropriate to enable the transmission bandwidth restriction function if the transmission bandwidth does not significantly change for a long time after either enabling or disabling the transmission bandwidth restriction function (criteria (3)). If the period the RWIN limits the transmission bandwidth is short, it is effective that the transmission bandwidth restriction function is on to prevent buffer overflow in the receiving computer. Including the condition that the time $\beta$ has elapsed since the reference_time B 413 in the conditions to shift to the state 1003 eliminates disabling the transmission bandwidth restriction function in the case where the period the RWIN limits the transmission bandwidth is short.

The foregoing $\alpha$, $\beta$, $\gamma$, N, and Z may be either fixed values or variables. For example, these values may vary depending on the RTT or loss rate.

The state machine 902 makes determination about the variation in RWIN (S409 and S414) to determine whether the operating system of the receiver computer is changing the RWIN. If the RWIN is increasing, the buffer size of the receiver computer may be increasing. In this case, there is a possibility that the transmission bandwidth will become unlimited by the RWIN, the transmission bandwidth restriction function switching module 903 enables the transmission bandwidth restriction function on a temporary basis until the RWIN becomes stable. If the RWIN is decreasing, the possibility of buffer overflow increases; accordingly, the state machine 902 enables the transmission bandwidth restriction function on a temporary basis.

The state machine 902 makes determination whether the time $\beta$ has elapsed since the reference_time B 413 (S415) to determine whether the RWIN limits the transmission bandwidth on a long-term basis or the inflight has exceeded $\alpha$ times the RWIN on a temporary basis. If the time $\beta$ has elapsed since the reference_time B 413, the state machine 902 determines that the transmission bandwidth is limited by the RWIN. This step eliminates the possibility of wrong determination based on the temporary state.

If the counter cnt 905 is the threshold N or more at Step S405, the state machine 902 shifts to the state 1000 (S406). This is because the state machine 902 does not shift to the state 1000 when the inflight is temporarily smaller than $\alpha$ times the RWIN but shifts to the state 1000 when the inflight is smaller than α times the RWIN on a long-term basis. This step eliminates the possibility of wrong determination based on a temporary state.

Figure 14:
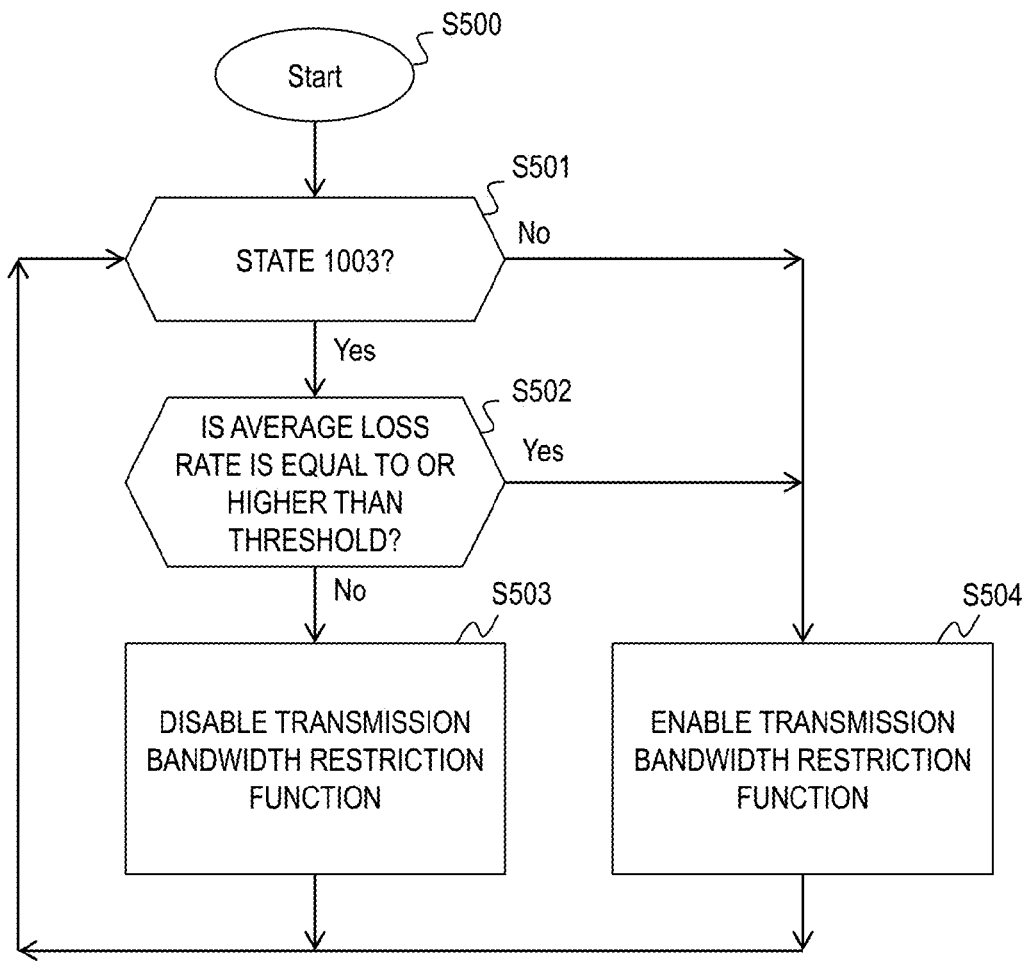
FIG. 14 is a flowchart of operation of a transmission bandwidth restriction function switching module in Embodiment 1.

FIG. 14 is a flowchart of an example of operation of the transmission bandwidth restriction function switching module 903. After starting processing (S500), the transmission bandwidth restriction function switching module 903 determines whether the state machine 902 is in the state 1003 (S501). If the state machine 902 is not in the state 1003 (S501: No), the transmission bandwidth restriction function switching module 903 enables the transmission bandwidth restriction function (S504). Thereafter, the transmission bandwidth restriction function switching module 903 returns to Step S501 to determine the state of the state machine 902.

If the state machine 902 is in the state 1003 (S501: Yes) and if the ave_loss_rate 403 is equal to or higher than x % (S502: Yes), the transmission bandwidth restriction function switching module 903 enables the transmission bandwidth restriction function (S504). Thereafter, the transmission bandwidth restriction function switching module 903 returns to Step S501 to determine the state of the state machine 902.

If the ave_loss_rate 403 is lower than x % (S502: No), the transmission bandwidth restriction function switching module 903 disables the transmission bandwidth restriction function (S503). The value of x may be fixed or dynamically varied depending on the RTT or the loss rate.

The control of the transmission bandwidth restriction function illustrated in FIGS. 13 and 14 may omit some steps. For example, determination about the variation rate of the loss rate, the variation in RWIN, the elapsed time since the reference_time B, or the average loss rate may be optional.

Figure 15:
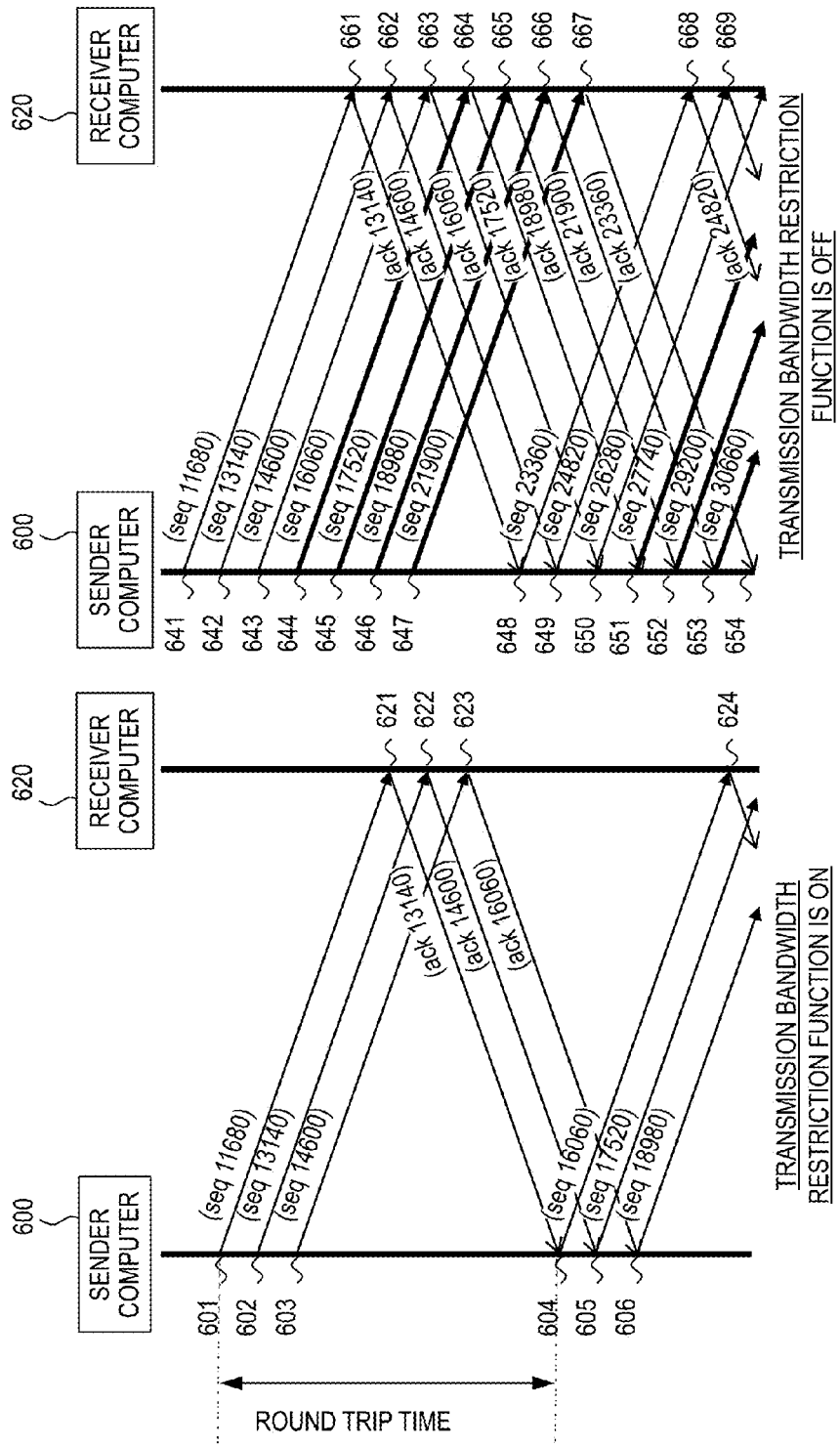
FIG. 15 is a comparative diagram of communication sequences between the cases where the transmission bandwidth restriction function is on and off in Embodiment 1.

FIG. 15 is a comparative diagram of communication sequences between the cases where the transmission bandwidth restriction function is on and off. This section is described assuming that the receiving computer 620 notifies the sender computer 600 of RWIN=4380 each time and that the sender computer 600 sends a packet having a payload size of 1460 each time, by way of example.

When the transmission bandwidth restriction function is on, the sender computer 600 is allowed to send three packets at maximum before receiving an ACK (packets 601 to 603). The receiver computer 620 that has received the three packets 601 to 603 returns corresponding ACK packets 621 to 623 to the sender computer 600. The sender computer 600 restarts sending packets after receiving the ACK packets 621 to 623 (604 to 606). As noted from this example, the sender computer 600 can send data only up to the RWIN during an RTT.

When the transmission bandwidth restriction function is off, the sender computer 600 is allowed to further send packets (packets 644 to 647) after sending the packets 641 to 643 so that the inflight reaches the RWIN. As a result, the sender computer 600 can send data more than the RWIN during an RTT. Accordingly, the transmission bandwidth can be broadened as far as the receiving buffer or the buffer of the NIC in the receiving computer is capable of receiving, independent from the size of the RWIN.

FIG. 15 provides an example where the MSS is always 1460 and the RWIN specified by the receiver computer to the sender computer is always 4380; however, the MSS and the RWIN may take any values and those values may vary during communication.

This embodiment enables transmission exceeding the receive window size when a broader transmission bandwidth is available and transmission within the receive window size when transmission exceeding the receive window size may degrade the transmission bandwidth, achieving increase in throughput. It should be noted that, although the foregoing example is about transmission bandwidth control in TCP communication, the transmission bandwidth control of this invention is applicable to other communication protocols.

Embodiment 2

Embodiment 1 has provided an example where the unique TCP function is implemented in a proxy apparatus. This embodiment describes an example where the unique TCP function is incorporated in the TCP function of the operating system of the sender computer. Unless specified otherwise, the components having the same configurations as those in Embodiment 1 are assigned the same reference signs and description thereof is omitted.

Figure 16:
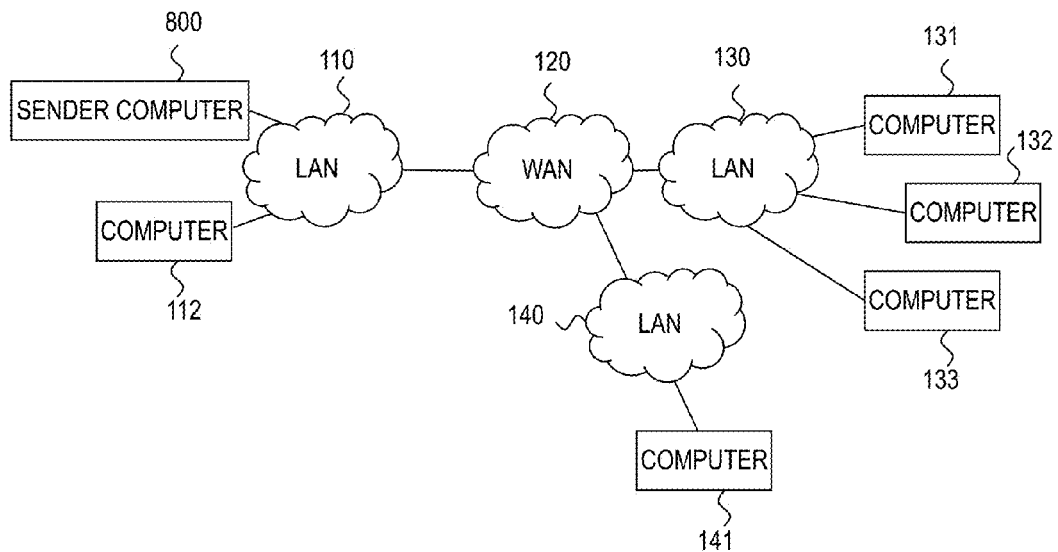
FIG. 16 is a configuration diagram of a network system including a sender computer in Embodiment 2.

FIG. 16 provides a configuration example of a network system including a sender computer 800 in Embodiment 2. The sender computer 800 is connected with the LAN 110. The difference from Embodiment 1 is that no communication apparatus 100 having a standard TCP function and a unique TCP function is provided on the path but the sender computer 800 uses the unique TCP to initiate sending data to the computers 112, 131, 132, 133, or 141.

Figure 17:
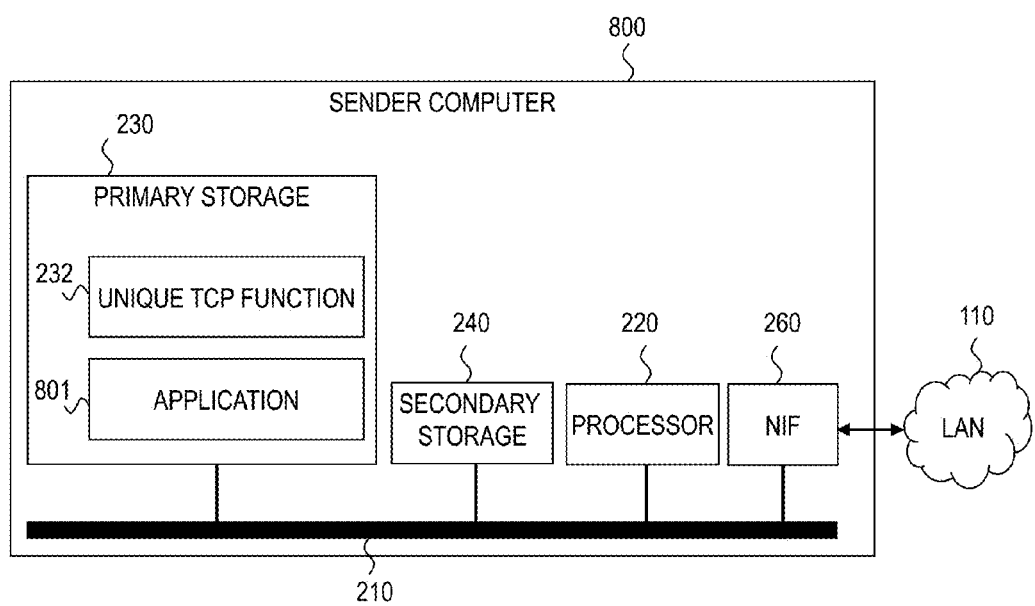
FIG. 17 is a hardware configuration diagram of the sender computer in Embodiment 2.
Figure 18:
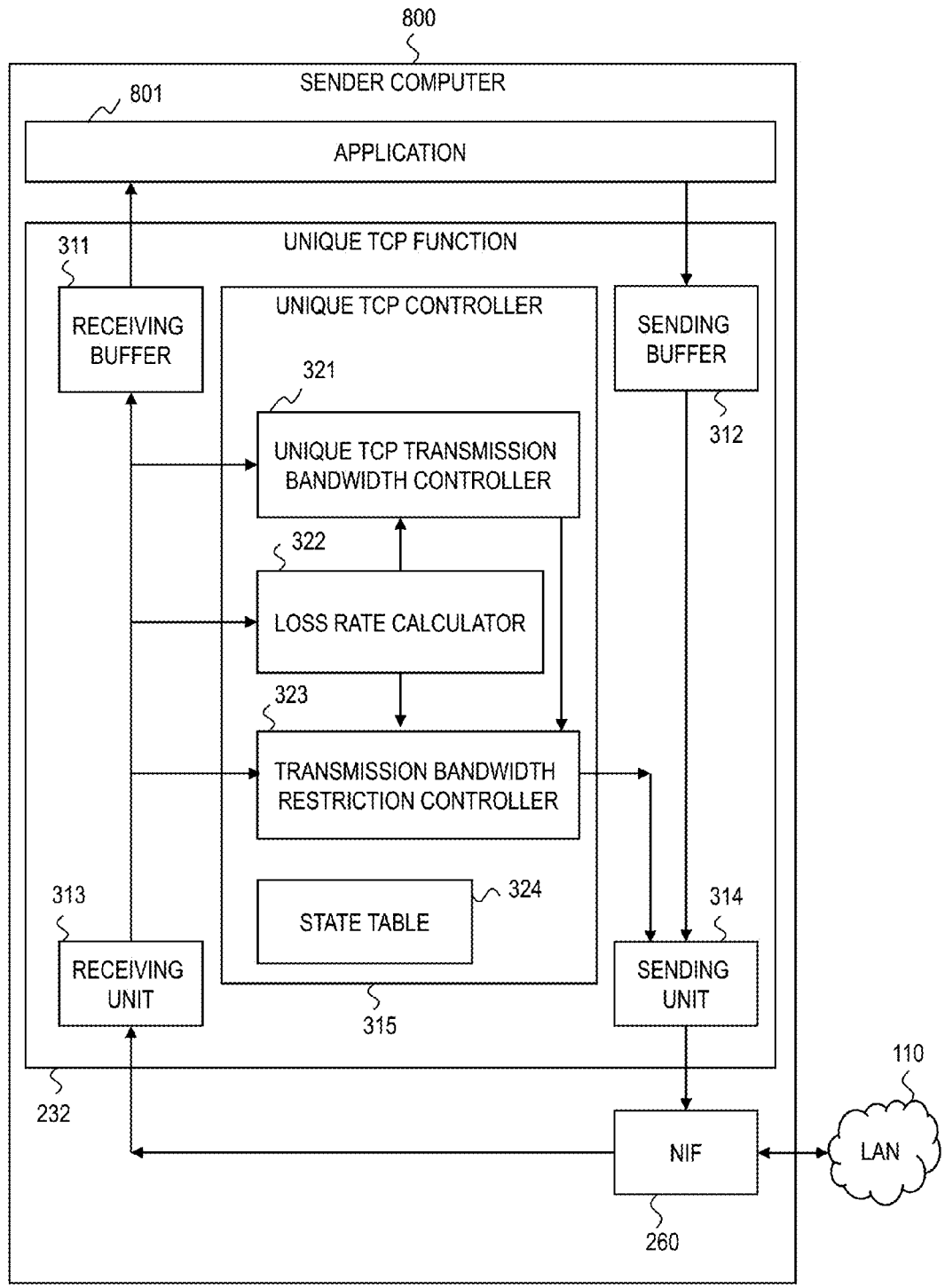
FIG. 18 is a functional block diagram of the sender computer in Embodiment 2.

FIG. 17 is a hardware configuration diagram of the sender computer 800 in Embodiment 2. FIG. 18 illustrates a function block configuration of the sender computer 800 in Embodiment 2. The application 801 exchanges data with the unique TCP function 232 and the unique TCP function 232 exchanges data with the LAN 110 through the NIF 260.

Although this embodiment has provided an example that the unique TCP function is incorporated in the operating system of the sender computer, the unique TCP function may be implemented in a user land application to be incorporated into the sender computer in such a manner that the same or another application uses the unique TCP function.

Embodiment 3

This embodiment provides an example that the proxy apparatus with the unique TCP function is implemented as a virtual communication apparatus. Unless specified otherwise, the components having the same configurations as those in Embodiment 1 are assigned the same reference signs and description thereof is omitted.

Figure 19:
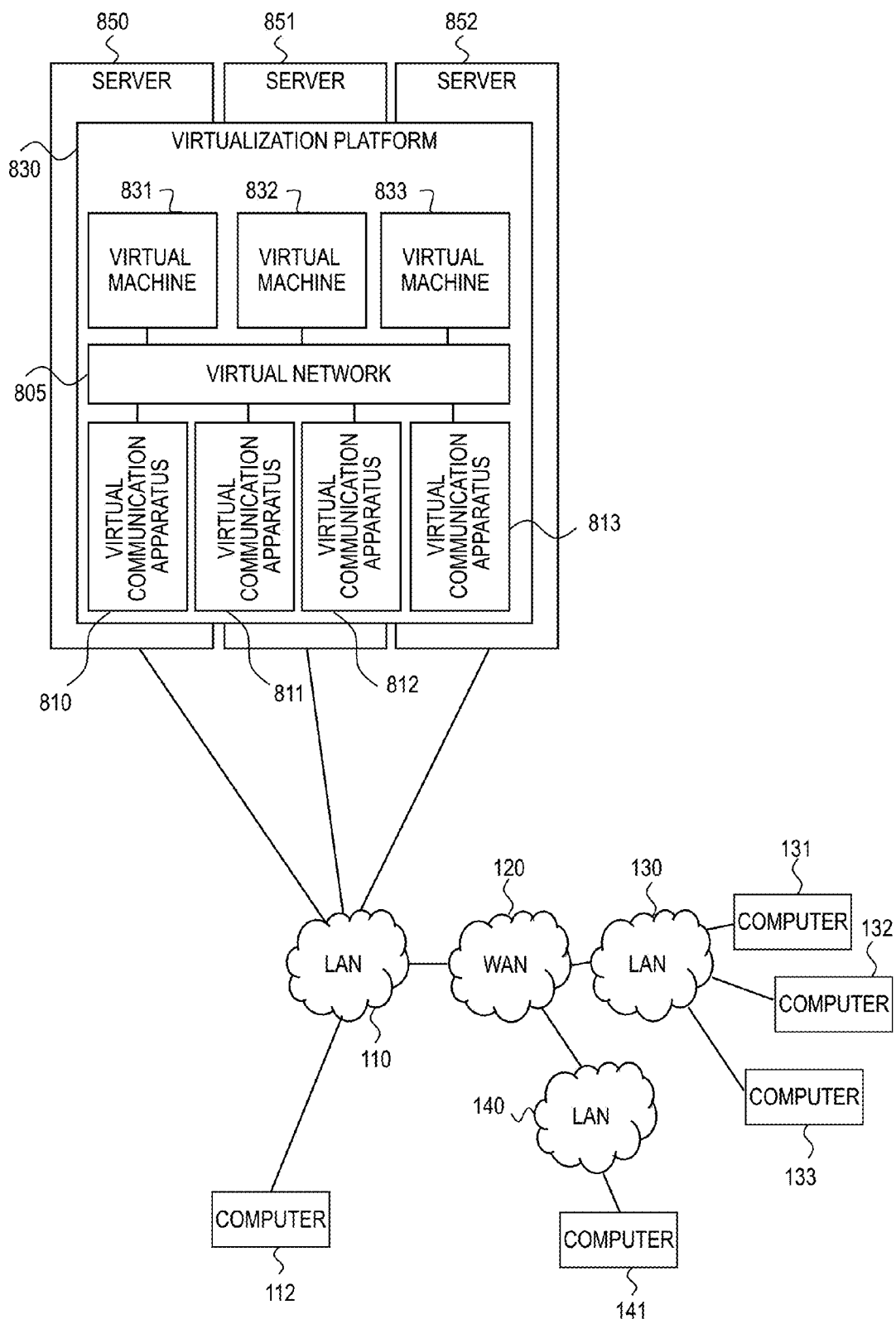
FIG. 19 is a configuration diagram of a network system including a virtual communication apparatus in Embodiment 3.

FIG. 19 is a configuration diagram of a network system including virtual communication apparatuses 810 to 813 in Embodiment 3. The virtualization platform 830 operates in such a manner that servers 850 to 852 share the software resources (such as virtual machines and a virtual network). The virtual communication apparatuses 810 to 813, virtual machines 831 to 833, and a virtual network 805 are run on the virtualization platform 830. In the following description, the components without explicit use of the word "virtual", inclusive of the servers 850 to 852, are real components.

The servers 850 to 852 are connected with the LAN 110. The virtual machines 831 to 833 and the virtual communication apparatuses 810 to 813 are connected with the virtual network 805. The virtual communication apparatuses 810 to 813 are also connected with the LAN 110 directly or via the virtual network 805. The virtual network 805 may connect the computers and the communication apparatuses as a single network or otherwise, the virtual network 805 may serve as a plurality of logical networks with a function such as VLAN and partition the connected computers and communication apparatuses.

In this system, the virtual communication apparatus 810 is a proxy apparatus for switching the standard TCP communication to the unique TCP communication. The virtual communication apparatuses 811 to 813 may be proxy apparatuses having the same functions as the virtual communication apparatus 810 or communication apparatuses having other functions such as firewall and load balancer.

For example, when the virtual machine 831 sends data to the computer 131 by TCP communication, the data sent from the virtual machine 831 reaches the virtual communication apparatus 810 via the virtual network 805 under the standard TCP bandwidth control and is forwarded by the virtual communication apparatus 810 to the computer 131 under the unique TCP bandwidth control.

FIG. 19 illustrates a case where three servers 850 to 852 share the software resources on the virtualization platform 830 by way of example; however, any plural number of servers may share the virtualization platform 830 or a single server may operate the virtualization platform 830.

Figure 20:
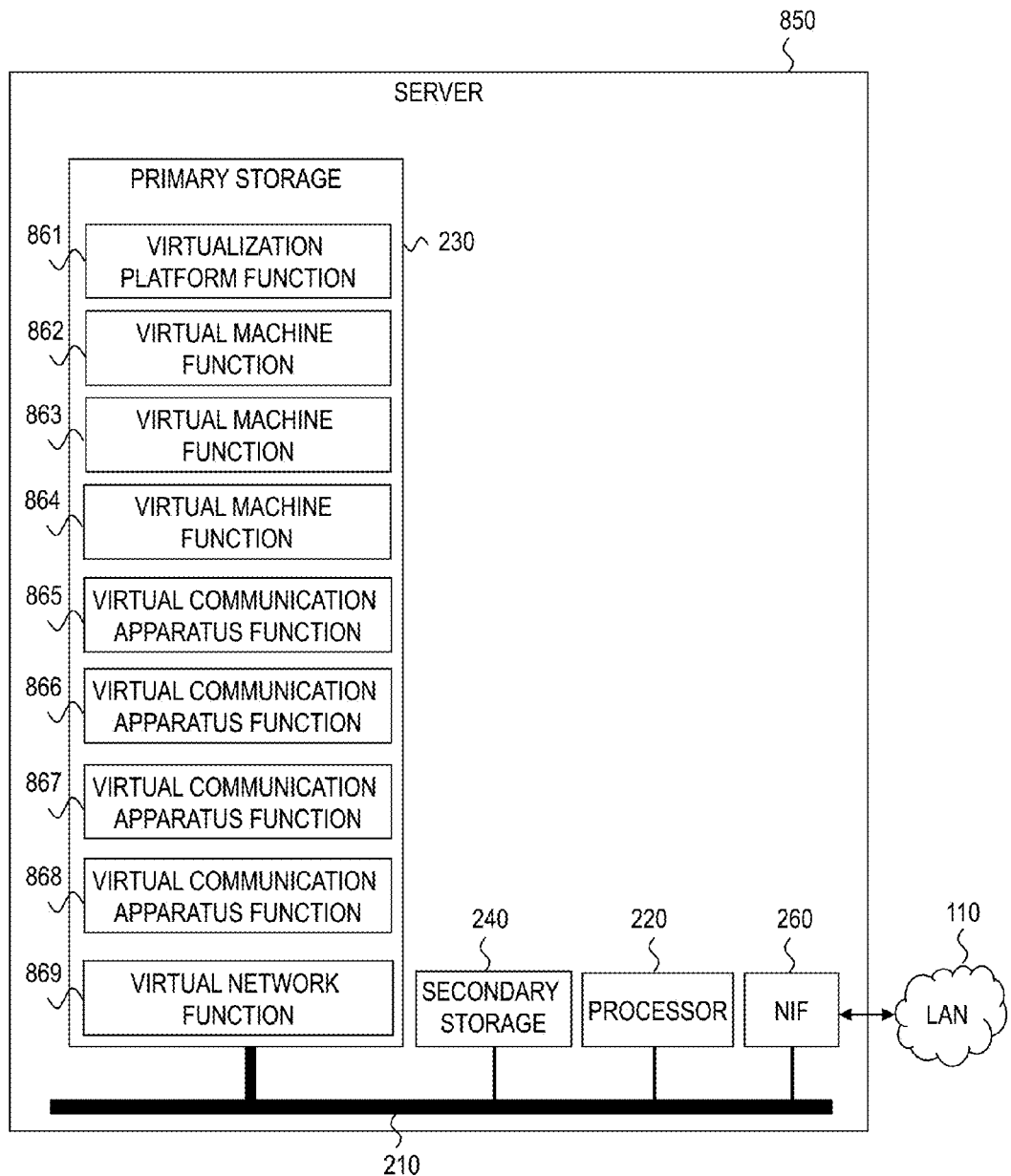
FIG. 20 is a hardware configuration diagram of a server including the virtual communication apparatus in Embodiment 3.

FIG. 20 is a hardware configuration diagram of the server 850 including the virtual communication apparatus 810 in Embodiment 3. The primary storage 230 stores programs for implementing a virtualization platform function 861, virtual machine functions 862 to 864, virtual communication apparatus functions 865 to 868, and a virtual network function 869. The processor 220 operates in accordance with these programs to implement the virtualization platform 830, the virtual machines 831 to 833, the virtual network 805, and the virtual communication apparatuses 810 to 813. The other servers 851 and 852 may have the same configuration.

Figure 21:
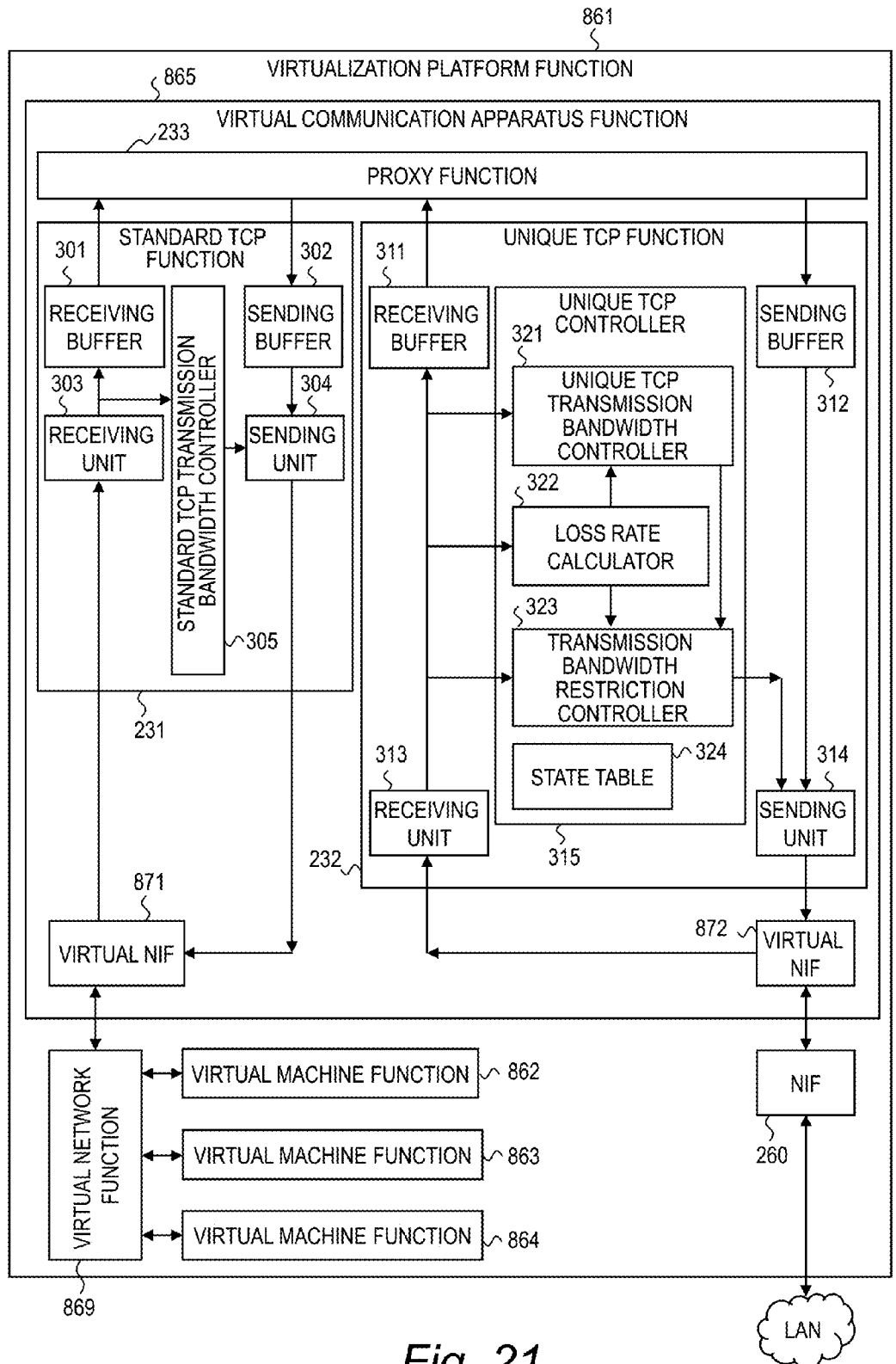
FIG. 21 is a functional block diagram of the server including the virtual communication apparatus in Embodiment 3.

FIG. 21 is a functional block diagram of the server 850. The differences between the virtual communication apparatus 810 and the communication apparatus 100 in Embodiment 1 are that the virtual communication apparatus 810 includes virtual NIFs 871 and 872 as NIFs and that the virtual NIF 871 is connected with the virtual network function 869. The virtual NIFs 871 and 872 are program modules in the virtual communication apparatus function 865.

FIG. 21 provides an example where the virtual NIF 871 is connected with the virtual network function 869; however, the virtual NIF 871 may directly be connected with the virtual machine functions 862 to 864. FIG. 21 provides an example where the virtual NIF 872 is directly connected with the NIF 260; however, the virtual NIF 872 may be connected with the NIF 260 via the virtual network function 869.

This invention is not limited to the above-described embodiments but includes various modifications. The above-described embodiments are explained in detail for better understanding of this invention and are not limited to those including all the configurations and elements described above. A part of the configuration of an embodiment may be replaced with a configuration of another embodiment or a configuration of an embodiment may be incorporated to a configuration of another embodiment. A part of the configuration of each embodiment may be added, deleted, or replaced by that of a different configuration. The above-described configurations, functions, and processing units, for all or a part of them, may be implemented by hardware: for example, by designing an integrated circuit. The above-described configurations and functions may be implemented by software, which means that a processor interprets and executes programs for providing the functions. The information of programs, tables, and files to implement the functions may be stored in a storage device such as a memory, a hard disk drive, or an SSD (Solid State Drive), or a storage medium such as an IC card, or an SD card.

What is claimed is:

1. A transmission apparatus connectable to a network, the transmission apparatus comprising:
   a sending unit configured to send data to a receiver apparatus via the network;
   a receiving unit configured to receive acknowledgement data including an acknowledgement and information on a receive window size from the receiver apparatus via the network;
   a transmission bandwidth controller configured to control a bandwidth for data to be sent from the sending unit;
   a transmission bandwidth restriction unit configured to restrict the bandwidth controlled by the transmission bandwidth controller in such a manner that a data size of data for which no acknowledgement is received from the receiver apparatus among data which has been from the sending unit is equal to or smaller than an upper limit size determined from the receive window size; and
   a switching controller configured to enable the transmission bandwidth restriction unit in a case where the data size is smaller than the receive window size and to disable the transmission bandwidth restriction unit in a case where the data size is equal to or larger than the receive window size.

2. The transmission apparatus according to claim 1, wherein the switching controller is configured to determine whether to switch the transmission bandwidth restriction unit from active to inactive based on whether the data size is larger than a threshold, the threshold being equal to or smaller than the upper limit size.

3. The transmission apparatus according to claim 2, wherein the switching controller is configured to determine whether to switch the transmission bandwidth restriction unit from active to inactive based on whether a state where the data size is equal to or larger than the threshold has lasted for a predetermined time.

4. The transmission apparatus according to claim 1, wherein the switching controller is configured to determine whether to switch the transmission bandwidth restriction unit from active to inactive based on whether a variation in the receive window size is less than a threshold.

5. The transmission apparatus according to claim 1, wherein the switching controller is configured to determine whether to switch the transmission bandwidth restriction unit from active to inactive based on whether a variation in loss rate of data sent from the sending unit is less than a threshold.

6. The transmission apparatus according to claim 1, wherein the switching controller is configured to determine whether to switch the transmission bandwidth restriction unit from active to inactive based on whether an average loss rate of data sent from the sending unit is lower than a threshold.

7. The transmission apparatus according to claim 2, wherein the switching controller is configured to determine whether to switch the transmission bandwidth restriction unit from inactive to active based on whether the data size is smaller than the threshold.

8. The transmission apparatus according to claim 7, wherein the switching controller is configured to determine whether to switch the transmission bandwidth restriction unit from inactive to active in a case where a state where the data size is smaller than the threshold has lasted for a predetermined time.

9. The transmission apparatus according to claim 1, wherein the switching controller is configured to determine whether to switch the transmission bandwidth restriction unit from inactive to active in a case where a variation in the receive window size is not less than a threshold.

10. The transmission apparatus according to claim 1, wherein the switching controller is configured to determine whether to switch the transmission bandwidth restriction unit from inactive to active in a case where a variation in loss rate of data sent from the sending unit is not less than a threshold.

11. The transmission apparatus according to claim 1, wherein the switching controller is configured to determine whether to switch the transmission bandwidth restriction unit from inactive to active in a case where an average loss rate of data sent from the sending unit is not lower than a threshold.

12. The transmission apparatus according to claim 1, wherein the transmission bandwidth controller is configured to control the bandwidth depending on tokens determined from a loss rate of data sent from the sending unit.

13. A control method for a transmission apparatus connectable to a network, the control method comprising:
   sending data to a receiver apparatus via the network;
   receiving acknowledgement data including an acknowledgement and information on a receive window size from the receiver apparatus via the network;
   controlling a bandwidth for data to be sent from the transmission apparatus;
   restricting the controlled bandwidth in such a manner that a data size of data for which no acknowledgement is received from the receiver apparatus among data which is sent is equal to or smaller than an upper limit size determined from the receive window size; and
   switching on the restricting the bandwidth in a case where the data size is smaller than the receive window size and switching off the restricting the bandwidth in a case where the data size is equal to or larger than the receive window size.

14. A non-transitory computer-readable storage medium storing commands for controlling a transmission apparatus including an interface, a processor, and a primary storage, the commands being to be executed by the processor to make the processor perform the following processing of:
   sending data to a receiver apparatus from the interface;
   receiving acknowledgement data including an acknowledgement and information on a receive window size from the receiver apparatus via the interface;
   controlling a bandwidth for data to be sent from the interface;
   restricting the controlled bandwidth in such a manner that a data size of data for which no acknowledgement is received from the receiver apparatus among data which is sent is equal to or smaller than an upper limit size determined from the receive window size; and
   switching on the restricting the bandwidth in a case where the data size is smaller than the receive window size and switching off the restricting the bandwidth in a case where the data size is equal to or larger than the receive window size.

* * * * *